US012739403B2

(12) United States Patent
Heo et al.

(10) Patent No.: US 12,739,403 B2

(45) Date of Patent: Sep. 15, 2026

(54) METHOD AND APPARATUS FOR ENCODING/DECODING IMAGE AND RECORDING MEDIUM FOR STORING BITSTREAM

(71) Applicants: HYUNDAI MOTOR COMPANY, Seoul (KR); KIA CORPORATION, Seoul (KR)

(72) Inventors: Jin Heo, Hwaseong-si (KR); Seung Wook Park, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 33 days.

(21) Appl. No.: 18/845,211

(22) PCT Filed: May 9, 2023

(86) PCT No.: PCT/KR2023/006253

§ 371 (c)(1),
(2) Date: Sep. 9, 2024

(87) PCT Pub. No.: WO2023/234579

PCT Pub. Date: Dec. 7, 2023

(65) Prior Publication Data

US 2025/0193412 A1 Jun. 12, 2025

(30) Foreign Application Priority Data

May 30, 2022 (KR) ........................ 10-2022-0065979
May 3, 2023 (KR) ........................ 10-2023-0057893

(51) Int. Cl.
*H04N 19/159* (2014.01)
*H04N 19/105* (2014.01)
(Continued)

(52) U.S. Cl.
CPC ......... *H04N 19/159* (2014.11); *H04N 19/105* (2014.11); *H04N 19/176* (2014.11); *H04N 19/593* (2014.11)

(58) Field of Classification Search
CPC ............... H04N 19/157; H04N 19/593; H04N 19/186; H04N 19/176; H04N 19/11; H04N 19/159; H04N 19/105
See application file for complete search history.

(56) References Cited

U.S. PATENT DOCUMENTS 10,178,408 B2 * 1/2019 Chono ................. H04N 19/176
11,979,555 B2 * 5/2024 Lee ...................... H04N 19/159
(Continued)

FOREIGN PATENT DOCUMENTS

KR 2019-0035739 A 4/2019
KR 2020-0136300 A 12/2020
(Continued)

OTHER PUBLICATIONS

Chang, Yao-Jen et al. Non-EE2: Chroma intra modes derived from collocated luma blocks and neighboring chroma blocks. JVET-Z0143-v2, Joint Video Experts Team (JVET) of ITU-T SG 16 WP 3 and ISO/IEC JTC 1/SC 29, 26th Meeting, by teleconference. pp. 1-4, Apr. 27, 2022.*
(Continued)

*Primary Examiner* — Tsion B Owens
(74) *Attorney, Agent, or Firm* — MCDONNELL BOEHNEN HULBERT & BERGHOFF LLP

(57) ABSTRACT

An image decoding method comprise determining a chroma intra prediction mode candidate group of a current chroma block from a reference block of the current chroma block, reordering intra prediction mode candidates of the chroma intra prediction mode candidate group of the current chroma block according to priorities of the intra prediction mode
(Continued)

candidates, obtaining chroma intra prediction mode information indicating an intra prediction mode of the current chroma block from the chroma intra prediction mode candidate group, and determining the intra prediction mode of the current chroma block based on the chroma intra prediction mode information.

17 Claims, 9 Drawing Sheets

(51) Int. Cl.
*H04N 19/176* (2014.01)
*H04N 19/593* (2014.01)

(56) References Cited

U.S. PATENT DOCUMENTS 12,231,655 B2 * 2/2025 Huo ..................... H04N 19/159
12,382,096 B2 * 8/2025 Kim ..................... H04N 19/159
2022/0007028 A1 * 1/2022 Li ........................ H04N 19/132
2022/0078410 A1 * 3/2022 Zhu ........................ H04N 19/11
2022/0368895 A1 * 11/2022 Heo ..................... H04N 19/105
2023/0276071 A1 * 8/2023 Jeon ....................... H04N 19/70
375/240.12
2024/0179320 A1 * 5/2024 Lim ..................... H04N 19/105
2024/0397076 A1 * 11/2024 Kang ................... H04N 19/159

FOREIGN PATENT DOCUMENTS

KR 2021-0116668 A 9/2021
WO WO-2020056779 A1 * 3/2020 ........... H04N 19/159

OTHER PUBLICATIONS

International Search Report and Written Opinion for Int. App. No. PCT/KR2023/00625, mailed Aug. 11, 2023.
Yao-Jen Chang et al., ‘Non-EE2: Chroma intra modes derived from collocated luma blocks and neighboring chroma blocks’, JVET-Z0143-v2, Joint Video Experts Team (JVET) of ITU-T SG 16 WP 3 and ISO/IEC JTC 1/SC 29, 26th Meeting, by teleconference, pp. 1-4, Apr. 27, 2022.

* cited by examiner

FIG. 6

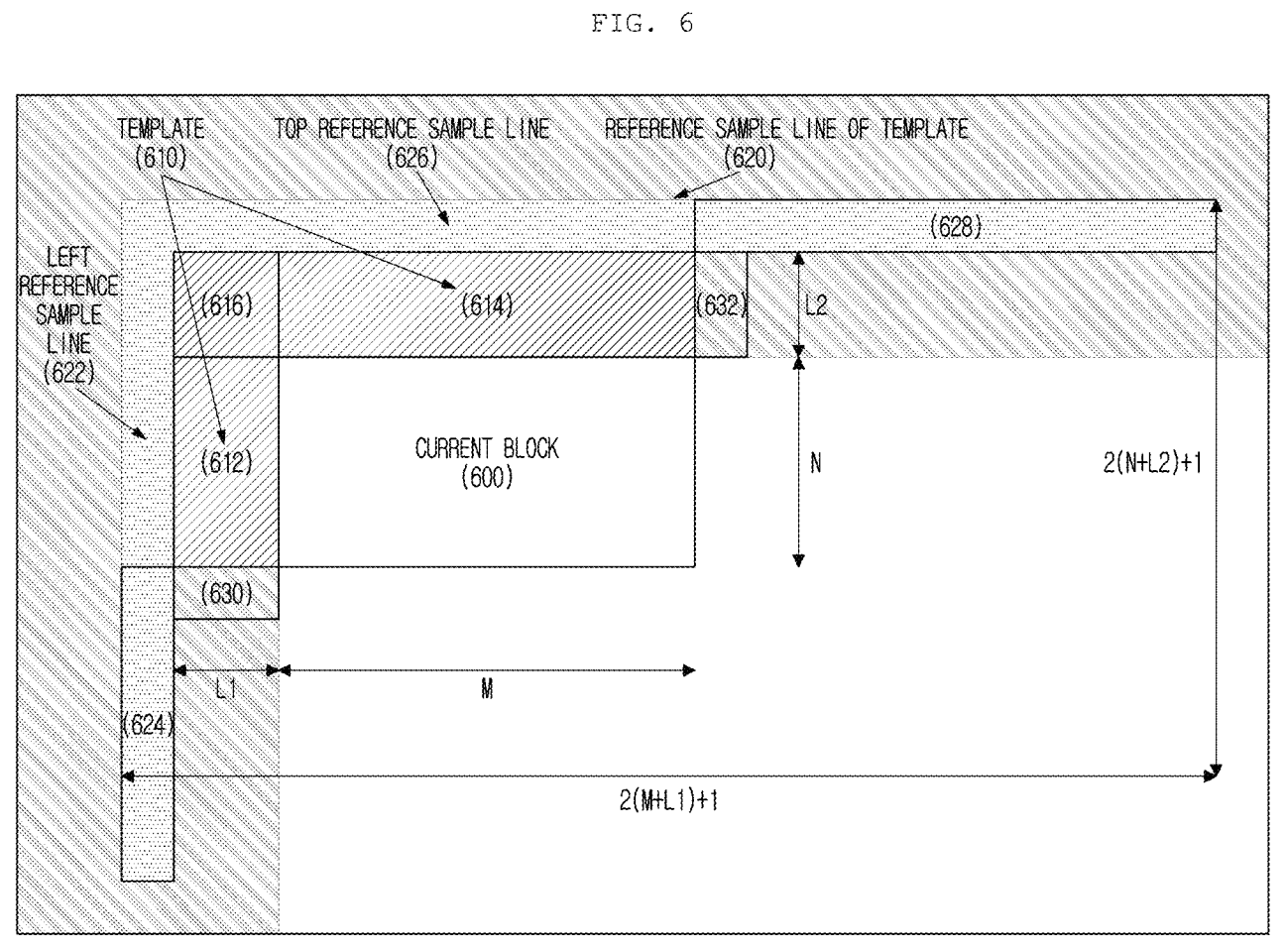

TEMPLATE (610)
TOP REFERENCE SAMPLE LINE (626)
REFERENCE SAMPLE LINE OF TEMPLATE (620)
LEFT REFERENCE SAMPLE LINE (622)
CURRENT BLOCK (600)
(612)
(614)
(616)
(624)
(628)
(630)
(632)
L1
L2
N
M
2(N+L2)+1
2(M+L1)+1

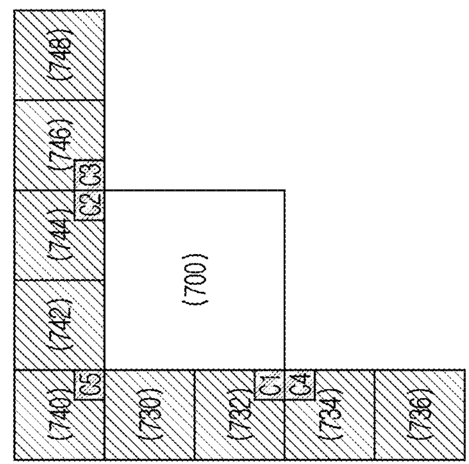
FIG. 7
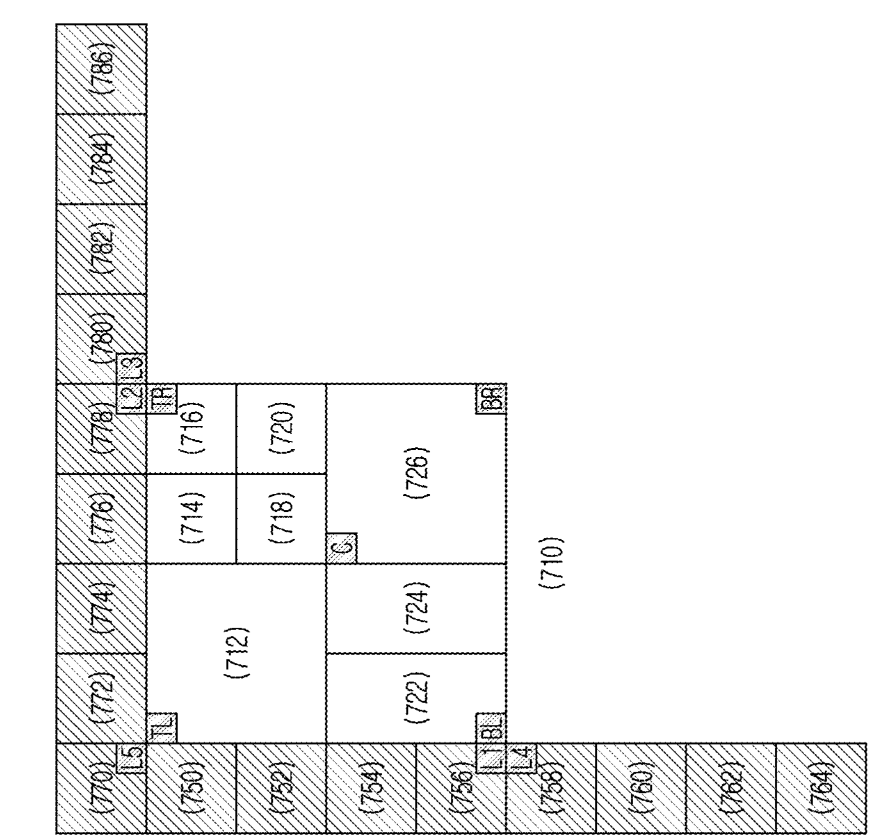

METHOD AND APPARATUS FOR ENCODING/DECODING IMAGE AND RECORDING MEDIUM FOR STORING BITSTREAM

CROSS REFERENCE TO RELATED APPLICATIONS

The present application is a U.S. National Phase Application pursuant to 35 U.S.C. § 371 of International Application No. PCT/KR2023/006253 filed May 9, 2023, which claims priority to Korean Patent Application No. 10-2022-0065979 filed May 30, 2022 and Korean Patent Application No. 10-2023-0057893 filed May 3, 2023. The entire disclosure contents of these applications are herewith incorporated by reference into the present application.

TECHNICAL FIELD

The present invention relates to an image encoding/decoding method and apparatus and a recording medium for storing a bitstream. More particularly, the present invention relates to an image encoding/decoding method and apparatus using a chroma intra prediction method and a recording medium for storing a bitstream.

BACKGROUND ART

Recently, the demand for high-resolution, high-quality images such as ultra-high definition (UHD) images is increasing in various application fields. As image data becomes higher in resolution and quality, the amount of data increases relatively compared to existing image data. Therefore, when transmitting image data using media such as existing wired and wireless broadband lines or storing image data using existing storage media, the transmission and storage costs increase. In order to solve these problems that occur as image data becomes higher in resolution and quality, high-efficiency image encoding/decoding technology for images with higher resolution and quality is required.

In intra prediction of an image, it is necessary to use different intra prediction mode determination methods depending on the color components of a block. In the case of a luma block, an intra prediction mode is determined independently of a chroma block, and all intra prediction modes supported by an image codec may be applied as intra prediction mode candidates. However, since a chroma block has high similarity with a corresponding luma block, a method of improving encoding efficiency by referencing the corresponding luma block to limit applicable intra prediction mode candidates is being discussed.

DISCLOSURE

Technical Problem

An object of the present invention is to provide an image encoding/decoding method and apparatus with improved encoding/decoding efficiency.

Another object of the present invention is to provide a recording medium for storing a bitstream generated by an image decoding method or apparatus provided by the present invention.

Technical Solution

An image decoding method according to an embodiment of the present invention may comprise determining a chroma intra prediction mode candidate group of a current chroma block from a reference block of the current chroma block, reordering intra prediction mode candidates of the chroma intra prediction mode candidate group of the current chroma block according to priorities of the intra prediction mode candidates, obtaining chroma intra prediction mode information indicating an intra prediction mode of the current chroma block from the chroma intra prediction mode candidate group, and determining the intra prediction mode of the current chroma block based on the chroma intra prediction mode information.

According to an embodiment, the reference block of the current chroma block may comprise a plurality of luma blocks split from a current luma block corresponding to the current chroma block.

According to an embodiment, the plurality of luma blocks may correspond to a plurality of reference positions of the current chroma block, and the plurality of reference positions may comprise at least two of a center position, a top left position, a top right position, a bottom left position, and a bottom right position.

According to an embodiment, the reference block of the current chroma block may comprise a chroma block adjacent to the current chroma block.

According to an embodiment, the block adjacent to the current chroma block may comprise at least one of a left chroma block, a top chroma block, a bottom left chroma block, a top right chroma block or a top left chroma block of the current chroma block.

According to an embodiment, the reference block of the current chroma block may comprise a luma block adjacent to a current luma block corresponding to the current chroma block.

According to an embodiment, the block adjacent to the current luma block may comprise at least one of a left luma block, a top luma block, a bottom left luma block, a top right luma block or a bottom left luma block of the current luma block.

According to an embodiment, the determining the chroma intra prediction mode candidate group of the current chroma block from the reference block of the current chroma block may comprise including an intra prediction mode of the reference block of the current chroma block in the chroma intra prediction mode candidate group, and including a secondary intra prediction mode derived from an intra prediction mode candidate included in the chroma intra prediction mode candidate group in the chroma intra prediction mode candidate group, when the number of intra prediction mode candidates included in the chroma intra prediction mode candidate group is less than a predetermined value.

According to an embodiment, the secondary intra prediction mode may be an intra prediction mode with an index value greater or less by a predetermined value than an index value of an intra prediction mode candidate of the chroma intra prediction mode candidate group.

According to an embodiment, the determining the chroma intra prediction mode candidate group of the current chroma block from the reference block of the current chroma block may comprise including an intra prediction mode derived from the reference block of the current chroma block in the chroma intra prediction mode candidate group, and including a default mode in the chroma intra prediction mode candidate group, when the number of intra prediction mode candidates included in the chroma intra prediction mode candidate group is less than a predetermined value.

According to an embodiment, the determining the chroma intra prediction mode candidate group of the current chroma block from the reference block of the current chroma block may comprise extracting an intra prediction mode from the reference block of the current chroma block, and including the extracted intra prediction mode in the chroma intra prediction mode candidate group, when the extracted intra prediction mode does not overlap with an intra prediction mode candidate included in the chroma intra prediction mode candidate group.

According to an embodiment, the priorities of the intra prediction mode candidates may be determined based on a template of the current chroma block.

According to an embodiment, the template may be a reconstructed region with a predetermined size and adjacent to at least one of a left or upper direction from the current chroma block, and the priorities of the intra prediction mode candidates may be determined based on a difference between a reconstructed sample of the template and a predicted sample of a template predicted according the intra prediction mode candidates.

According to an embodiment, the priorities of the intra prediction mode candidates may be determined based on a plurality of relevant blocks of the current chroma block.

According to an embodiment, the priorities of the intra prediction mode candidates may be determined by calculating the number of relevant blocks to which the intra prediction mode candidates are applied or a total area of the relevant blocks.

According to an embodiment, the relevant blocks of the current chroma block may comprise at least one of a luma block included in a current luma block corresponding to the current chroma block, a chroma block adjacent to the current chroma block, a luma block adjacent to the current luma block or a chroma block decoded before decoding the current chroma block.

According to an embodiment, the chroma intra prediction mode information may comprise dominant flag information indicating whether a first intra prediction mode candidate of the chroma intra prediction mode candidate group is an intra prediction mode of the current chroma block, and remaining index information indicating an intra prediction mode of the current chroma block among remaining intra prediction mode candidates excluding the first intra prediction mode candidate of the chroma intra prediction mode candidate group, when the dominant flag information indicates that an intra prediction mode of the current chroma block is not the first intra prediction mode candidate of the chroma intra prediction mode candidate group.

An image encoding method according to an embodiment of the present invention may comprise determining a chroma intra prediction mode candidate group of a current chroma block from a reference block of the current chroma block, reordering intra prediction mode candidates of the chroma intra prediction mode candidate group of the current chroma block according to priorities of the intra prediction mode candidates, determining the intra prediction mode of the current chroma block, and encoding chroma intra prediction mode information indicating the intra prediction mode of the current chroma block from the chroma intra prediction mode candidate group.

A non-transitory computer-readable recording medium according to an embodiment of the present invention may store a bitstream generated by the image encoding method.

A transmission method according to an embodiment of the present invention transmits a bitstream generated by the image encoding method.

The features briefly summarized above with respect to the present disclosure are merely exemplary aspects of the detailed description below of the present disclosure, and do not limit the scope of the present disclosure.

Advantageous Effects

The present invention proposes a method of improving a method of determining an intra prediction mode applied to a chroma block.

In the present invention, by including an intra prediction mode that is highly applicable to a current chroma block in a chroma intra prediction mode candidate group, prediction coding efficiency of the chroma block can be improved.

In addition, in the present invention, by reordering intra prediction mode candidates of a chroma intra prediction mode candidate group according to applicability to a current chroma block, prediction coding efficiency of the chroma block can be improved.

In addition, in the present invention, prediction coding efficiency of the chroma block can be improved according to various binarization methods for chroma intra prediction mode information indicating the intra prediction mode of the chroma block.

DESCRIPTION OF DRAWINGS

FIG. 6 shows a template of a current chroma block used in a template-based intra mode derivation method and reference pixels of the template used to generate a prediction template.

FIG. 7 illustrates blocks for determining the occurrence frequency of an intra prediction mode for reordering an intra prediction mode candidate of a chroma intra prediction mode candidate group.

BEST MODE

Figure 1:
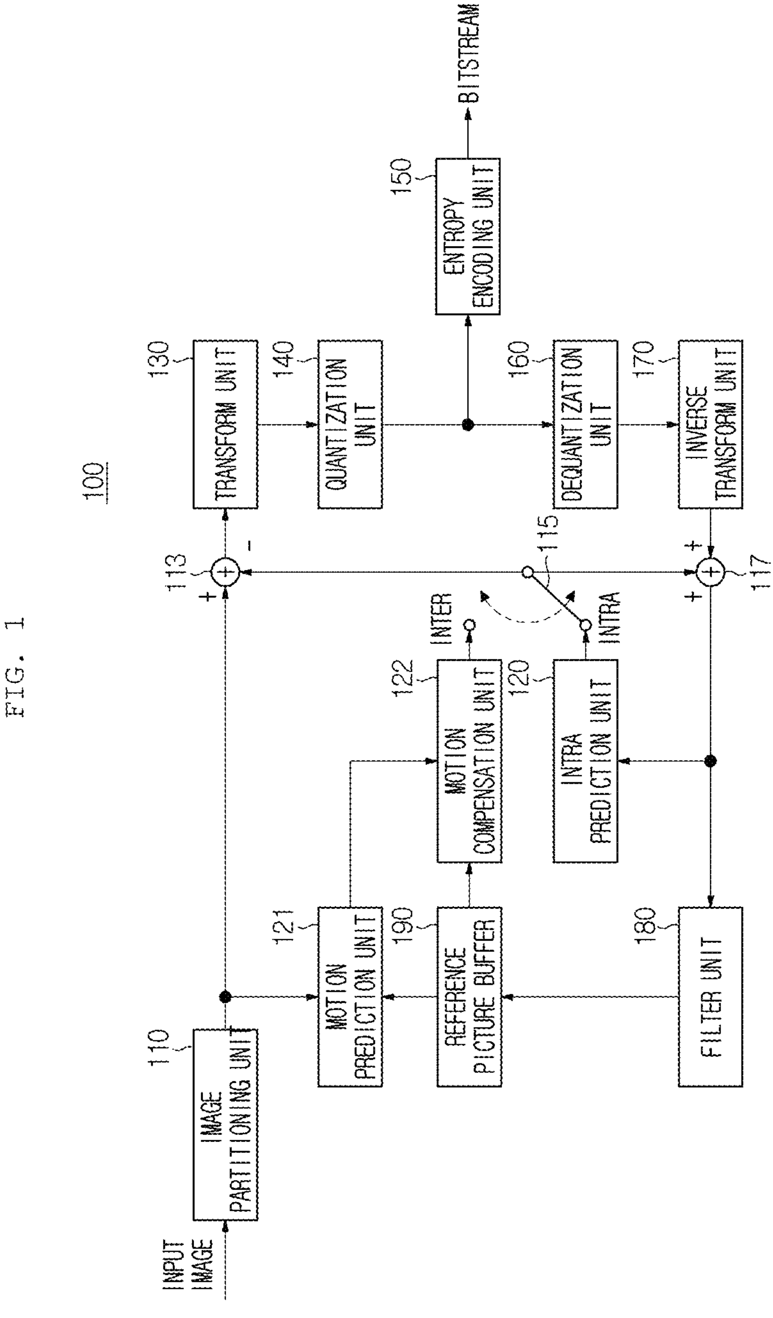
FIG. 1 is a block diagram showing a configuration of an encoding apparatus according to an embodiment of the present invention.

An image decoding method according to an embodiment of the present invention may comprise determining a chroma intra prediction mode candidate group of a current chroma block from a reference block of the current chroma block, reordering intra prediction mode candidates of the chroma intra prediction mode candidate group of the current chroma block according to priorities of the intra prediction mode candidates, obtaining chroma intra prediction mode information indicating an intra prediction mode of the current chroma block from the chroma intra prediction mode candidate group, and determining the intra prediction mode of the current chroma block based on the chroma intra prediction mode information.

MODE FOR INVENTION

The present invention may have various modifications and embodiments, and specific embodiments are illustrated in the drawings and described in detail in the detailed description. However, this is not intended to limit the present invention to specific embodiments, but should be understood to include all modifications, equivalents, or substitutes included in the spirit and technical scope of the present invention. Similar reference numerals in the drawings indicate the same or similar functions throughout various aspects. The shapes and sizes of elements in the drawings may be provided by way of example for a clearer description. The detailed description of the exemplary embodiments described below refers to the accompanying drawings, which illustrate specific embodiments by way of example. These embodiments are described in sufficient detail to enable those skilled in the art to practice the embodiments. It should be understood that the various embodiments are different from each other, but are not necessarily mutually exclusive. For example, specific shapes, structures, and characteristics described herein may be implemented in other embodiments without departing from the spirit and scope of the present invention with respect to one embodiment. It should also be understood that the positions or arrangements of individual components within each disclosed embodiment may be changed without departing from the spirit and scope of the embodiment. Accordingly, the detailed description set forth below is not intended to be limiting, and the scope of the exemplary embodiments is defined only by the appended claims, along with the full scope of equivalents to which such claims are entitled, if properly described.

In the present invention, the terms first, second, etc. may be used to describe various components, but the components should not be limited by the terms. The terms are only used for the purpose of distinguishing one component from another. For example, without departing from the scope of the present invention, the first component may be referred to as the second component, and similarly, the second component may also be referred to as the first component. The term and/or includes a combination of a plurality of related described items or any item among a plurality of related described items.

The components shown in the embodiments of the present invention are independently depicted to indicate different characteristic functions, and do not mean that each component is formed as a separate hardware or software configuration unit. That is, each component is listed and included as a separate component for convenience of explanation, and at least two of the components may be combined to form a single component, or one component may be divided into multiple components to perform a function, and embodiments in which components are integrated and embodiments in which each component is divided are also included in the scope of the present invention as long as they do not deviate from the essence of the present invention.

The terminology used in the present invention is only used to describe specific embodiments and is not intended to limit the present invention. The singular expression includes the plural expression unless the context clearly indicates otherwise. In addition, some components of the present invention are not essential components that perform essential functions in the present invention and may be optional components only for improving performance. The present invention may be implemented by including only essential components for implementing the essence of the present invention excluding components only used for improving performance, and a structure including only essential components excluding optional components only used for improving performance is also included in the scope of the present invention.

In an embodiment, the term "at least one" may mean one of a number greater than or equal to 1, such as 1, 2, 3, and 4. In an embodiment, the term "a plurality of" may mean one of a number greater than or equal to 2, such as 2, 3, and 4.

Hereinafter, embodiments of the present invention will be specifically described with reference to the drawings. In describing the embodiments of this specification, if it is determined that a detailed description of a related known configuration or function may obscure the subject matter of this specification, the detailed description will be omitted, and the same reference numerals will be used for the same components in the drawings, and repeated descriptions of the same components will be omitted.

Description of Terms

Hereinafter, "image" may mean one picture constituting a video, and may also refer to the video itself. For example, "encoding and/or decoding of an image" may mean "encoding and/or decoding of a video," and may also mean "encoding and/or decoding of one of images constituting the video."

Hereinafter, "moving image" and "video" may be used with the same meaning and may be used interchangeably. In addition, a target image may be an encoding target image that is a target of encoding and/or a decoding target image that is a target of decoding. In addition, the target image may be an input image input to an encoding apparatus and may be an input image input to a decoding apparatus. Here, the target image may have the same meaning as a current image.

Hereinafter, "image", "picture", "frame" and "screen" may be used with the same meaning and may be used interchangeably.

Hereinafter, a "target block" may be an encoding target block that is a target of encoding and/or a decoding target block that is a target of decoding. In addition, the target block may be a current block that is a target of current encoding and/or decoding. For example, "target block" and "current block" may be used with the same meaning and may be used interchangeably.

Hereinafter, "block" and "unit" may be used with the same meaning and may be used interchangeably. In addition, "unit" may mean including a luma component block and a chroma component block corresponding thereto in order to distinguish it from a block. For example, a coding tree unit (CTU) may be composed of one luma component (Y) coding tree block (CTB) and two chroma component (Cb, Cr) coding tree blocks related to it.

Hereinafter, "sample", "picture element" and "pixel" may be used with the same meaning and may be used interchangeably. Herein, a sample may represent a basic unit that constitutes a block.

Hereinafter, "inter" and "inter-screen" may be used with the same meaning and can be used interchangeably.

Hereinafter, "intra" and "in-screen" may be used with the same meaning and can be used interchangeably.

FIG. 1 is a block diagram showing a configuration of an encoding apparatus according to an embodiment of the present invention.

The encoding apparatus 100 may be an encoder, a video encoding apparatus, or an image encoding apparatus. A video may include one or more images. The encoding apparatus 100 may sequentially encode one or more images.

Referring to FIG. 1, the encoding apparatus 100 may include an image partitioning unit 110, an intra prediction unit 120, a motion prediction unit 121, a motion compensation unit 122, a switch 115, a subtractor 125, a transform unit 130, a quantization unit 140, an entropy encoding unit 150, a dequantization unit 160, an inverse transform unit 170, an adder 117, a filter unit 180 and a reference picture buffer 190.

In addition, the encoding apparatus 100 may generate a bitstream including information encoded through encoding of an input image, and output the generated bitstream. The generated bitstream may be stored in a computer-readable recording medium, or may be streamed through a wired/wireless transmission medium.

The image partitioning unit 110 may partition the input image into various forms to increase the efficiency of video encoding/decoding. That is, the input video is composed of multiple pictures, and one picture may be hierarchically partitioned and processed for compression efficiency, parallel processing, etc. For example, one picture may be partitioned into one or multiple tiles or slices, and then partitioned again into multiple CTUs (Coding Tree Units). Alternatively, one picture may first be partitioned into multiple sub-pictures defined as groups of rectangular slices, and each sub-picture may be partitioned into the tiles/slices. Here, the sub-picture may be utilized to support the function of partially independently encoding/decoding and transmitting the picture. Since multiple sub-pictures may be individually reconstructed, it has the advantage of easy editing in applications that configure multi-channel inputs into one picture. In addition, a tile may be divided horizontally to generate bricks. Here, the brick may be utilized as the basic unit of parallel processing within the picture. In addition, one CTU may be recursively partitioned into quad trees (QTs), and the terminal node of the partition may be defined as a CU (Coding Unit). The CU may be partitioned into a PU (Prediction Unit), which is a prediction unit, and a TU (Transform Unit), which is a transform unit, to perform prediction and partition. Meanwhile, the CU may be utilized as the prediction unit and/or the transform unit itself. Here, for flexible partition, each CTU may be recursively partitioned into multi-type trees (MTTs) as well as quad trees (QTs). The partition of the CTU into multi-type trees may start from the terminal node of the QT, and the MTT may be composed of a binary tree (BT) and a triple tree (TT). For example, the MTT structure may be classified into a vertical binary split mode (SPLIT_BT_VER), a horizontal binary split mode (SPLIT_BT_HOR), a vertical ternary split mode (SPLIT_TT_VER), and a horizontal ternary split mode (SPLIT_TT_HOR). In addition, a minimum block size (MinQTSize) of the quad tree of the luma block during partition may be set to 16×16, a maximum block size (MaxBtSize) of the binary tree may be set to 128×128, and a maximum block size (MaxTtSize) of the triple tree may be set to 64×64. In addition, a minimum block size (MinBtSize) of the binary tree and a minimum block size (MinTtSize) of the triple tree may be specified as 4×4, and the maximum depth (MaxMttDepth) of the multi-type tree may be specified as 4. In addition, in order to increase the encoding efficiency of the I slice, a dual tree that differently uses CTU partition structures of luma and chroma components may be applied. The above quad-tree structure may include a rectangular quad-tree structure and a triangular quad-tree tree structure to which geometric partitioning is applied. And the above ternary tree structure may include a rectangular ternary tree structure and an asymmetric ternary tree structure to which geometric partitioning is applied. The above binary tree structure may include a rectangular binary tree structure and a geometric binary tree structure to which geometric partitioning is applied. On the other hand, in P and B slices, the luma and chroma CTBs (Coding Tree Blocks) within the CTU may be partitioned into a single tree that shares the coding tree structure.

The encoding apparatus 100 may perform encoding on the input image in the intra mode and/or the inter mode. Alternatively, the encoding apparatus 100 may perform encoding on the input image in a third mode (e.g., IBC mode, Palette mode, etc.) other than the intra mode and the inter mode. However, if the third mode has functional characteristics similar to the intra mode or the inter mode, it may be classified as the intra mode or the inter mode for convenience of explanation. In the present invention, the third mode will be classified and described separately only when a specific description thereof is required.

When the intra mode is used as the prediction mode, the switch 115 may be switched to intra, and when the inter mode is used as the prediction mode, the switch 115 may be switched to inter. Here, the intra mode may mean an intra prediction mode, and the inter mode may mean an inter prediction mode. The encoding apparatus 100 may generate a prediction block for an input block of the input image. In addition, the encoding apparatus 100 may encode a residual block using a residual of the input block and the prediction block after the prediction block is generated. The input image may be referred to as a current image which is a current encoding target. The input block may be referred to as a current block which is a current encoding target or an encoding target block.

When a prediction mode is an intra mode, the intra prediction unit 120 may use a sample of a block that has been already encoded/decoded around a current block as a reference sample. The intra prediction unit 120 may perform spatial prediction for the current block by using the reference sample, or generate prediction samples of an input block through spatial prediction. Herein, the intra prediction may mean intra prediction.

As an intra prediction method, non-directional prediction modes such as DC mode and Planar mode and directional prediction modes (e.g., 65 directions) may be applied. Here, the intra prediction method may be expressed as an intra prediction mode or an intra prediction mode.

When a prediction mode is an inter mode, the motion prediction unit 111 may retrieve a region that best matches with an input block from a reference image in a motion prediction process, and derive a motion vector by using the retrieved region. In this case, a search region may be used as the region. The reference image may be stored in the reference picture buffer 190. Here, when encoding/decoding for the reference image is performed, it may be stored in the reference picture buffer 190.

The motion compensation unit 112 may generate a prediction block of the current block by performing motion compensation using a motion vector. Herein, inter prediction may mean inter prediction or motion compensation.

When the value of the motion vector is not an integer, the motion prediction unit 111 and the motion compensation unit 112 may generate the prediction block by applying an interpolation filter to a partial region of the reference picture. In order to perform inter prediction or motion compensation, it may be determined whether the motion prediction and motion compensation mode of the prediction unit included in the coding unit is one of a skip mode, a merge mode, an advanced motion vector prediction (AMVP) mode, and an intra block copy (IBC) mode based on the coding unit and inter prediction or motion compensation may be performed according to each mode.

In addition, based on the above inter prediction method, an AFFINE mode of sub-PU based prediction, an SbTMVP (Subblock-based Temporal Motion Vector Prediction) mode, an MMVD (Merge with MVD) mode of PU-based prediction, and a GPM (Geometric Partitioning Mode) mode may be applied. In addition, in order to improve the performance of each mode, HMVP (History based MVP), PAMVP (Pairwise Average MVP), CIIP (Combined Intra/Inter Prediction), AMVR (Adaptive Motion Vector Resolution), BDOF (Bi-Directional Optical-Flow), BCW (Bi-predictive with CU Weights), LIC (Local Illumination Compensation), TM (Template Matching), OBMC (Overlapped Block Motion Compensation), etc. may be applied.

The subtractor 113 may generate a residual block by using a difference between an input block and a prediction block. The residual block may be called a residual signal. The residual signal may mean a difference between an original signal and a prediction signal. Alternatively, the residual signal may be a signal generated by transforming or quantizing, or transforming and quantizing a difference between the original signal and the prediction signal. The residual block may be a residual signal of a block unit.

The transform unit 130 may generate a transform coefficient by performing transform on a residual block, and output the generated transform coefficient. Herein, the transform coefficient may be a coefficient value generated by performing transform on the residual block. When a transform skip mode is applied, the transform unit 130 may skip transform of the residual block.

A quantized level may be generated by applying quantization to the transform coefficient or to the residual signal. Hereinafter, the quantized level may also be called a transform coefficient in embodiments.

For example, a 4×4 luma residual block generated through intra prediction is transformed using a base vector based on DST (Discrete Sine Transform), and transform may be performed on the remaining residual block using a base vector based on DCT (Discrete Cosine Transform). In addition, a transform block is partitioned into a quad tree shape for one block using RQT (Residual Quad Tree) technology, and after performing transform and quantization on each transformed block partitioned through ROT, a coded block flag (cbf) may be transmitted to increase encoding efficiency when all coefficients become 0.

As another alternative, the Multiple Transform Selection (MTS) technique, which selectively uses multiple transform bases to perform transform, may be applied. That is, instead of partitioning a CU into TUs through RQT, a function similar to TU partition may be performed through the sub-block Transform (SBT) technique. Specifically, SBT is applied only to inter prediction blocks, and unlike ROT, the current block may be partitioned into 12 or 14 sizes in the vertical or horizontal direction and then transform may be performed on only one of the blocks. For example, if it is partitioned vertically, transform may be performed on the leftmost or rightmost block, and if it is partitioned horizontally, transform may be performed on the topmost or bottommost block.

In addition, LENST (Low Frequency Non-Separable Transform), a secondary transform technique that additionally transforms the residual signal transformed into the frequency domain through DCT or DST, may be applied. LENST additionally performs transform on the low-frequency region of 4×4 or 8×8 in the upper left, so that the residual coefficients may be concentrated in the upper left.

The quantization unit 140 may generate a quantized level by quantizing the transform coefficient or the residual signal according to a quantization parameter (QP), and output the generated quantized level. Herein, the quantization unit 140 may quantize the transform coefficient by using a quantization matrix.

For example, a quantizer using QP values of 0 to 51 may be used. Alternatively, if the image size is larger and high encoding efficiency is required, the QP of 0 to 63 may be used. Also, a DQ (Dependent Quantization) method using two quantizers instead of one quantizer may be applied. DQ performs quantization using two quantizers (e.g., Q0 and Q1), but even without signaling information about the use of a specific quantizer, the quantizer to be used for the next transform coefficient may be selected based on the current state through a state transition model.

The entropy encoding unit 150 may generate a bitstream by performing entropy encoding according to a probability distribution on values calculated by the quantization unit 140 or on coding parameter values calculated when performing encoding, and output the bitstream. The entropy encoding unit 150 may perform entropy encoding of information on a sample of an image and information for decoding an image. For example, the information for decoding the image may include a syntax element.

When is applied, entropy encoding symbols are represented so that a smaller number of bits are assigned to a symbol having a high occurrence probability and a larger number of bits are assigned to a symbol having a low occurrence probability, and thus, the size of bit stream for symbols to be encoded may be decreased. The entropy encoding unit 150 may use an encoding method, such as exponential Golomb, context-adaptive variable length coding (CAVLC), context-adaptive binary arithmetic coding (CABAC), etc., for entropy encoding. For example, the entropy encoding unit 150 may perform entropy encoding by using a variable length coding/code (VLC) table. In addition, the entropy encoding unit 150 may derive a binarization method of a target symbol and a probability model of a target symbol/bin, and perform arithmetic coding by using the derived binarization method, and a context model.

In relation to this, when applying CABAC, in order to reduce the size of the probability table stored in the decoding apparatus, a table probability update method may be changed to a table update method using a simple equation and applied. In addition, two different probability models may be used to obtain more accurate symbol probability values.

In order to encode a transform coefficient level (quantized level), the entropy encoding unit 150 may change a two-dimensional block form coefficient into a one-dimensional vector form through a transform coefficient scanning method.

A coding parameter may include information (flag, index, etc.) encoded in the encoding apparatus 100 and signaled to the decoding apparatus 200, such as syntax element, and information derived in the encoding or decoding process, and may mean information required when encoding or decoding an image.

Herein, signaling the flag or index may mean that a corresponding flag or index is entropy encoded and included in a bitstream in an encoder, and may mean that the corresponding flag or index is entropy decoded from a bitstream in a decoder.

The encoded current image may be used as a reference image for another image to be processed later. Therefore, the encoding apparatus 100 may reconstruct or decode the encoded current image again and store the reconstructed or decoded image as a reference image in the reference picture buffer 190.

A quantized level may be dequantized in the dequantization unit 160, or may be inversely transformed in the inverse transform unit 170. A dequantized and/or inversely transformed coefficient may be added with a prediction block through the adder: Herein, the dequantized and/or inversely transformed coefficient may mean a coefficient on which at least one of dequantization and inverse transform is performed, and may mean a reconstructed residual block. The dequantization unit 160 and the inverse transform unit 170 may be performed as an inverse process of the quantization unit 140 and the transform unit 130.

The reconstructed block may pass through the filter unit 180. The filter unit 180 may apply a deblocking filter, a sample adaptive offset (SAO), an adaptive loop filter (ALF), a bilateral filter (BIF), luma mapping with chroma scaling (LMCS), etc. to a reconstructed sample, a reconstructed block or a reconstructed image using all or some filtering techniques. The filter unit 180 may be called an in-loop filter. In this case, the in-loop filter is also used as name excluding LMCS.

The deblocking filter may remove block distortion generated in boundaries between blocks. In order to determine whether or not to apply a deblocking filter, whether or not to apply a deblocking filter to a current block may be determined based on samples included in several rows or columns which are included in the block. When a deblocking filter is applied to a block, a different filter may be applied according to a required deblocking filtering strength.

In order to compensate for encoding error using sample adaptive offset, a proper offset value may be added to a sample value. The sample adaptive offset may correct an offset of a deblocked image from an original image by a sample unit. A method of partitioning a sample included in an image into a predetermined number of regions, determining a region to which an offset is applied, and applying the offset to the determined region, or a method of applying an offset in consideration of edge information on each sample may be used.

A bilateral filter (BIF) may also correct the offset from the original image on a sample-by-sample basis for the image on which deblocking has been performed.

The adaptive loop filter may perform filtering based on a comparison result of the reconstructed image and the original image. Samples included in an image may be partitioned into predetermined groups, a filter to be applied to each group may be determined, and differential filtering may be performed for each group. Information of whether or not to apply the ALF may be signaled by coding units (CUs), and a form and coefficient of the adaptive loop filter to be applied to each block may vary.

In LMCS (Luma Mapping with Chroma Scaling), luma mapping (LM) means remapping luma values through a piece-wise linear model, and chroma scaling (CS) means a technique for scaling the residual value of the chroma component according to the average luma value of the prediction signal. In particular, LMCS may be utilized as an HDR correction technique that reflects the characteristics of HDR (High Dynamic Range) images.

The reconstructed block or the reconstructed image having passed through the filter unit 180 may be stored in the reference picture buffer 190. A reconstructed block that has passed through the filter unit 180 may be a part of a reference image. That is, the reference image is a reconstructed image composed of reconstructed blocks that have passed through the filter unit 180. The stored reference image may be used later in inter prediction or motion compensation.

Figure 2:
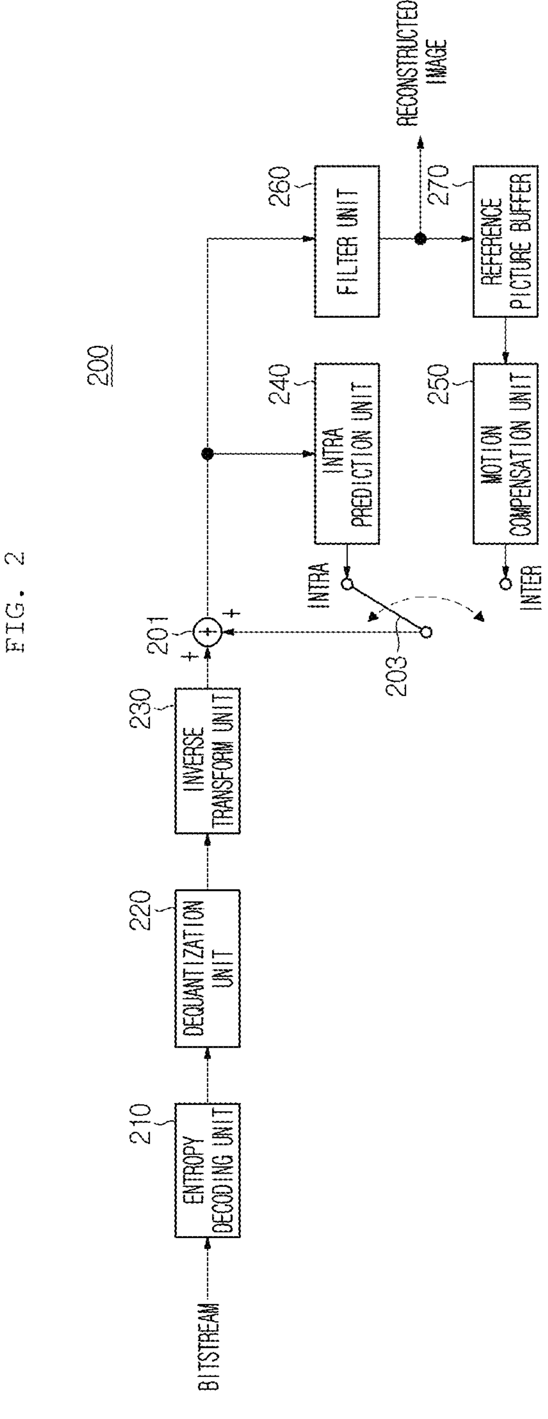
FIG. 2 is a block diagram showing a configuration of a decoding apparatus according to an embodiment of the present invention.

FIG. 2 is a block diagram showing a configuration of a decoding apparatus according to an embodiment of the present invention.

A decoding apparatus 200 may a decoder, a video decoding apparatus, or an image decoding apparatus.

Referring to FIG. 2, the decoding apparatus 200 may include an entropy decoding unit 210, a dequantization unit 220, an inverse transform unit 230, an intra prediction unit 240, a motion compensation unit 250, an adder 201, a switch 203, a filter unit 260, and a reference picture buffer 270.

The decoding apparatus 200 may receive a bitstream output from the encoding apparatus 100. The decoding apparatus 200 may receive a bitstream stored in a computer-readable recording medium, or may receive a bitstream that is streamed through a wired/wireless transmission medium. The decoding apparatus 200 may decode the bitstream in an intra mode or an inter mode. In addition, the decoding apparatus 200 may generate a reconstructed image generated through decoding or a decoded image, and output the reconstructed image or decoded image.

When a prediction mode used for decoding is an intra mode, the switch 20 may be switched to intra. Alternatively, when a prediction mode used for decoding is an inter mode, the switch 203 may be switched to inter.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block and the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be an inverse process of the entropy encoding method described above.

The entropy decoding unit 210 may change a one-dimensional vector-shaped coefficient into a two-dimensional block-shaped coefficient through a transform coefficient scanning method to decode a transform coefficient level (quantized level).

A quantized level may be dequantized in the dequantization unit 220, or inversely transformed in the inverse transform unit 230. The quantized level may be a result of dequantization and/or inverse transform, and may be generated as a reconstructed residual block. Herein, the dequantization unit 220 may apply a quantization matrix to the quantized level. The dequantization unit 220 and the inverse transform unit 230 applied to the decoding apparatus may apply the same technology as the dequantization unit 160 and inverse transform unit 170 applied to the aforementioned encoding apparatus.

When an intra mode is used, the intra prediction unit 240 may generate a prediction block by performing, on the current block, spatial prediction that uses a sample value of a block which has been already decoded around a decoding target block. The intra prediction unit 240 applied to the decoding apparatus may apply the same technology as the intra prediction unit 120 applied to the aforementioned encoding apparatus.

When an inter mode is used, the motion compensation unit 250 may generate a prediction block by performing, on the current block, motion compensation that uses a motion vector and a reference image stored in the reference picture buffer 270. The motion compensation unit 250 may generate a prediction block by applying an interpolation filter to a partial region within a reference image when the value of the motion vector is not an integer value. In order to perform motion compensation, it may be determined whether the motion compensation method of the prediction unit included in the corresponding coding unit is a skip mode, a merge mode, an AMVP mode, or a current picture reference mode based on the coding unit, and motion compensation may be performed according to each mode. The motion compensation unit 250 applied to the decoding apparatus may apply the same technology as the motion compensation unit 122 applied to the encoding apparatus described above.

The adder 201 may generate a reconstructed block by adding the reconstructed residual block and the prediction block. The filter unit 260 may apply at least one of inverse-LMCS, a deblocking filter, a sample adaptive offset, and an adaptive loop filter to the reconstructed block or reconstructed image. The filter unit 260 applied to the decoding apparatus may apply the same filtering technology as that applied to the filter unit 180 applied to the aforementioned encoding apparatus.

The filter unit 260 may output the reconstructed image. The reconstructed block or reconstructed image may be stored in the reference picture buffer 270 and used for inter prediction. A reconstructed block that has passed through the filter unit 260 may be a part of a reference image. That is, a reference image may be a reconstructed image composed of reconstructed blocks that have passed through the filter unit 260. The stored reference image may be used later in inter prediction or motion compensation.

Figure 3:
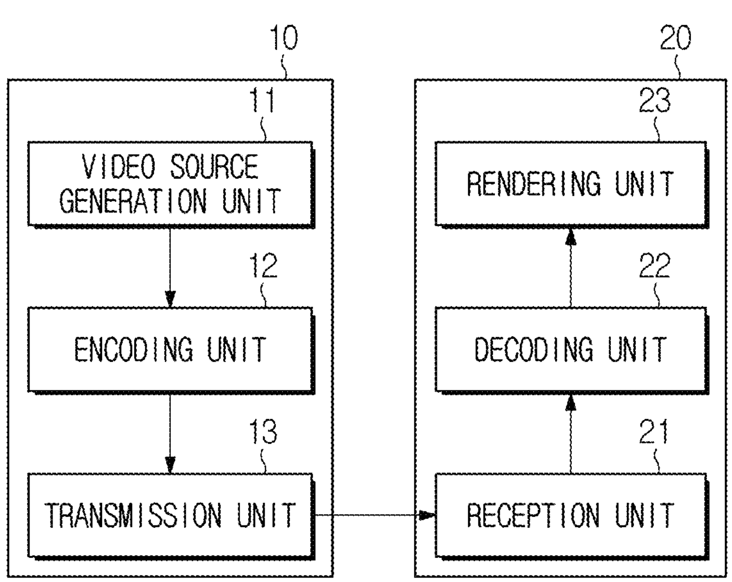
FIG. 3 is a diagram schematically showing a video coding system to which the present invention is applicable.

FIG. 3 is a diagram schematically showing a video coding system to which the present invention is applicable.

A video coding system according to an embodiment may include an encoding apparatus 10 and a decoding apparatus 20. The encoding apparatus 10 may transmit encoded video and/or image information or data to the decoding apparatus 20 in the form of a file or streaming through a digital storage medium or a network.

The encoding apparatus 10 according to an embodiment may include a video source generation unit 11, an encoding unit 12, a transmission unit 13. The decoding apparatus 20 according to an embodiment may include a reception unit 21, a decoding unit 22, and a rendering unit 23. The encoding unit 12 may be called a video/image encoding unit, and the decoding unit 22 may be called a video/image decoding unit. The transmission unit 13 may be included in the encoding unit 12. The reception unit 21 may be included in the decoding unit 22. The rendering unit 23 may include a display unit, and the display unit may be configured as a separate device or an external component.

The video source generation unit 11 may obtain the video/image through a process of capturing, synthesizing, or generating the video/image. The video source generation unit 11 may include a video/image capture device and/or a video/image generation device. The video/image capture device may include, for example, one or more cameras, a video/image archive including previously captured video/image, etc. The video/image generation device may include, for example, a computer, a tablet, and a smartphone, etc., and may (electronically) generate the video/image. For example, a virtual video/image may be generated through a computer, etc., in which case the video/image capture process may be replaced with a process of generating related data.

The encoding unit 12 may encode the input video/image. The encoding unit 12 may perform a series of procedures such as prediction, transform, and quantization for compression and encoding efficiency. The encoding unit 12 may output encoded data (encoded video/image information) in the form of a bitstream. The detailed configuration of the encoding unit 12 may also be configured in the same manner as the encoding apparatus 100 of FIG. 1 described above.

The transmission unit 13 may transmit encoded video/image information or data output in the form of a bitstream to the reception unit 21 of the decoding apparatus through a digital storage medium or a network in the form 20 of a file or streaming. The digital storage medium may include various storage media such as USB, SD, CD, DVD, Blu-ray, HDD, SSD, etc. The transmission unit 13 may include an element for generating a media file through a predetermined file format and may include an element for transmission through a broadcasting/communication network. The reception unit 21 may extract/receive the bitstream from the storage medium or the network and transmit it to the decoding unit 22.

The decoding unit 22 may decode the video/image by performing a series of procedures such as dequantization, inverse transform, and prediction corresponding to the operation of the encoding unit 12. The detailed configuration of the decoding unit 22 may also be configured in the same manner as the above-described decoding apparatus 200 of FIG. 2.

The rendering unit 23 may render the decoded video/image. The rendered video/image may be displayed through the display unit.

In the present invention, various embodiments of a method of determining an intra prediction mode of a chroma block are described.

An intra prediction mode applicable to a luma block may be applied to a chroma block. In addition, a CCLM (cross component linear model) mode that predicts a chroma block based on a sample value of a reconstructed luma block may also be applied to the chroma block. In the present invention, an intra prediction mode other than a CCLM mode is defined as a non-CCLM mode.

In the CCLM mode, a relationship between a luma component sample and a chroma component sample is defined as a linear model. At this time, in order to determine the linear model, neighboring samples of a current chroma block and neighboring samples of a current luma block may be referenced. For example, the left sample and the top sample of the current chroma block and the left sample and the top sample of the current luma block may be referenced to determine the linear model. In addition, in some embodiments, only the left sample or the top sample may be referenced to determine the linear model.

In addition, according to the linear model, the sample value of the current chroma block may be derived from the sample value of the current luma block. At this time, the current luma block and the current chroma block correspond to each other in position and size. In addition, the position of the sample of the current chroma block and the position of the sample of the current luma block referenced by the sample of the current chroma block correspond to each other.

According to an embodiment, in order to determine the intra prediction mode of the chroma block, a chroma intra prediction mode candidate group may be determined. In addition, the intra prediction mode of the chroma block may be selected from among candidates of the chroma intra prediction mode candidate group. The chroma intra prediction mode candidate group may include not only a CCLM mode, but also an intra prediction mode that may be applied to a luma block (e.g., a DC mode, a planar mode, a directional intra prediction mode, etc.).

According to an embodiment, a chroma intra prediction mode candidate group of a current chroma block may include N non-CCLM modes. N may be an integer greater than or equal to 5. The N non-CCLM modes may be composed of M default modes and an intra prediction mode of a current luma block corresponding to the current chroma block. M is an integer smaller than N. The M default modes may include at least one of a DC mode, a planar mode, a vertical mode, or a horizontal mode. Alternatively, the chroma intra prediction mode candidate group may be composed of only an intra prediction mode of a block related to a current chroma block without a default mode.

According to an embodiment, the chroma intra prediction mode candidate group of the current chroma block may further include one or more CCLM modes. The one or more CCLM modes may include at least one of an LT CCLM mode referencing both left reference regions and top reference regions of the current chroma block and the current luma block, an L CCLM mode referencing only the left reference regions of the current chroma block and the current luma block, or a T CCLM mode referencing the top reference regions of the current chroma block and the current luma block. As described above, a linear model between samples of the current chroma block and the current luma block is determined based on the reference regions of the current chroma block and the current luma block.

According to an embodiment, in a chroma intra prediction mode candidate group, chroma intra prediction mode candidates may be sequentially derived according to a method according to a set order. At this time, a method of deriving four chroma intra prediction mode candidates is described in the present invention. In addition, four chroma intra prediction mode sets are derived by the four chroma intra prediction mode candidates, and the chroma intra prediction mode candidate group may be determined according to the intra prediction modes of the four chroma intra prediction mode sets.

At this time, the four chroma intra prediction mode sets may include a first set including multiple direct modes (MDM), a second set including intra prediction modes of neighboring chroma blocks of a current chroma block, a third set including intra prediction modes of neighboring luma blocks of the current luma block, a fourth set including secondary intra prediction modes, and a fifth set including default modes. When the chroma intra prediction mode candidate group of the current chroma block includes nine chroma intra prediction modes, nine non-overlapping chroma intra prediction modes of the four chroma intra prediction mode sets may be sequentially added to the chroma intra prediction mode candidate group in a predetermined order.

The multiple direct modes are intra prediction modes derived from a plurality of luma blocks corresponding to the current chroma block. In the case of a single tree structure, a luma image and a chroma image are split according to the same tree structure. Therefore, when a single tree structure is applied, one chroma block may correspond to only one luma block. However, in the case of a dual tree structure, the luma image and the chroma image may be split according to different tree structures. Therefore, one chroma block may correspond to a plurality of luma blocks. This dual tree structure may be mainly applied to an intra picture to which only intra prediction is applied.

A dual tree structure may be applied to an intra picture to which only intra prediction is applied, and by using multiple direct modes that derive two or more chroma intra prediction mode candidates from two or more luma blocks that are positionally related to a chroma block, the efficiency of derivation of the intra prediction mode of the chroma block may be increased.

According to an embodiment, the plurality of luma blocks corresponding to the current chroma block may include luma blocks corresponding to the center (C), top right (TR), top left (TL), bottom right (BR), and bottom left (BL) positions of the current chroma block. The positions referenced by the multiple direct modes are merely examples and may include a left position, a right position, a top position, and a bottom position. In addition, the number of positions referenced by the multiple direct modes is determined to be two or more, and the positions referenced by the multiple direct modes may be selected from among the above-mentioned positions.

The first set sequentially includes intra prediction modes derived from multiple direct modes. At this time, the first set may include up to five intra prediction modes derived from a plurality of luma blocks included in the current luma block corresponding to the current chroma block. At this time, the first set may include the intra prediction modes in a predetermined order with respect to the reference positions. For example, the predetermined order may be an order of C, TR, TL, BR, and BL. The above order is only an example, and the order may be changed according to an embodiment.

In including the intra prediction modes in the first set, whether the intra prediction modes derived from the multiple direct modes overlap is checked. In addition, only the non-overlapping intra prediction modes are added to the first set. The intra prediction modes derived from the multiple direct modes are added to the first set in an arbitrary order. The intra prediction modes included in the first set are included in the chroma intra prediction mode candidate group.

In addition, in the process of constructing the first set, if the maximum number of intra prediction modes of the chroma intra prediction mode candidate group are all determined, the process of constructing the first set is terminated. Then, based on the first set, the chroma intra prediction mode candidate group is determined, and the construction of the second set is not performed.

The second set may include the intra prediction modes of the neighboring chroma blocks of the current chroma block. The intra prediction modes of the current chroma block and the neighboring chroma blocks are likely to be the same. Therefore, the intra prediction modes of the neighboring chroma blocks may be included in the chroma intra prediction mode candidate group so that the intra prediction modes of the neighboring chroma blocks may be applied to the current block as well.

At this time, the intra prediction modes of the left chroma block, the top chroma block, the top right chroma block, the bottom left chroma block, and the top left chroma block of the current chroma block may be sequentially included in the second set. In some embodiments, the positions of the referenced neighboring chroma blocks may be changed. In addition, in some embodiments, only the left chroma block and the top chroma block of the current chroma block may be referenced.

In constructing the second set, whether the intra prediction modes of the neighboring chroma blocks overlap may be determined. In other words, it may be determined whether the intra prediction modes of the neighboring chroma blocks are already included in the chroma intra prediction mode candidate group. In addition, if the intra prediction modes of the neighboring chroma blocks are not included in the chroma intra prediction mode candidate group, the intra prediction modes may be included in the second set. The intra prediction modes included in the second set are included in the chroma intra prediction mode candidate group.

According to an embodiment, if the number of intra prediction modes of the first set is less than the maximum number of candidates of the chroma intra prediction mode candidate group, the second set may be determined. In addition, in the process of constructing the second set, if the intra prediction modes of the maximum number of candidates of the chroma intra prediction mode candidate group are all determined, the process of constructing the second set is terminated. Then, based on the first set and the second set, the chroma intra prediction mode candidate group is determined, and the construction of the third set is not performed.

The third set may include intra prediction modes of neighboring luma blocks of the current luma block corresponding to the current chroma block. The current luma blocks for determining the third set are determined to include all luma samples corresponding to the positions of the chroma samples of the current chroma block. Therefore, the current luma blocks for determining the third set may be a block that may be further split, rather than a block that has been split.

With reference to the surrounding positions of the current luma block, a neighboring luma block for determining the third set may be determined. At this time, the intra prediction modes of the left luma block, the top luma block, the top right luma block, the bottom left luma block, and the top left luma block of the current luma block may be sequentially included in the third set. In some embodiments, the positions of the referenced neighboring luma blocks may be changed. In addition, in some embodiments, only the left luma block and the top luma block of the current luma block may be referenced.

In constructing the third set, whether the intra prediction modes of the neighboring luma blocks overlap may be determined. In other words, it may be determined whether the intra prediction modes of the neighboring luma blocks are already included in the chroma intra prediction mode candidate group. In addition, if the intra prediction modes of the neighboring luma blocks are not included in the chroma intra prediction mode candidate group, the intra prediction modes may be included in the third set. The intra prediction modes included in the third set are included in the chroma intra prediction mode candidate group.

According to an embodiment, if the number of intra prediction modes of the first set and the second set is less than the maximum number of candidates of the chroma intra prediction mode candidate group, the third set may be determined. In addition, in the process of constructing the third set, if the intra prediction modes of the maximum number of candidates of the chroma intra prediction mode candidate group are all determined, the process of constructing the third set is terminated. Then, based on the first to third sets, the chroma intra prediction mode candidate group is determined, and the construction of the fourth set is not performed.

The fourth set may include secondary intra prediction modes derived from the first or second intra prediction mode of the chroma intra prediction mode candidate group. That is, the fourth set may include secondary intra prediction modes derived from the intra prediction mode included in one of the first to third sets. In some embodiments, the fourth set may include secondary intra prediction modes derived from a third or subsequent intra prediction mode of the chroma intra prediction mode candidate group.

The secondary intra prediction modes may include an intra prediction mode having an index value that is larger or smaller than an index value of the first intra prediction mode of the chroma intra prediction mode candidate group by 1. In some embodiments, a difference between the index value of the first intra prediction mode and the index value of the secondary chroma intra prediction mode may be 2 or more. After the secondary intra prediction mode is derived from the first intra prediction mode, the secondary intra prediction mode may be further derived from the second intra prediction mode. If a third or subsequent intra prediction mode of the chroma intra prediction mode candidate group may be referenced, the secondary intra prediction mode may be further derived from the third or subsequent intra prediction mode.

In constructing the fourth set, whether the secondary intra prediction modes overlap may be determined. In other words, it may be determined whether the secondary intra prediction modes are already included in the chroma intra prediction mode candidate group. In addition, if the secondary intra prediction modes are not included in the chroma intra prediction mode candidate group, the secondary intra prediction modes may be included in the fourth set. The intra prediction modes (secondary intra prediction modes) included in the fourth set are included in the chroma intra prediction mode candidate group.

According to an embodiment, if the number of intra prediction modes of the first to third sets is less than the maximum number of candidates of the chroma intra prediction mode candidate group, the fourth set may be determined. In addition, in the process of constructing the fourth set, if the intra prediction modes of the maximum number of candidates of the chroma intra prediction mode candidate group are all determined, the process of constructing the fourth set is terminated. Then, based on the first to fourth sets, the chroma intra prediction mode candidate group is determined, and the construction of the fifth set is not performed.

The fifth set includes preset default modes. According to an embodiment, the default modes may include one or more of a Planar mode, a vertical mode, a horizontal mode, a DC mode, a diagonal mode in the top right direction, a diagonal mode in the top left direction, a diagonal mode in the bottom left direction, an intra prediction mode having an index value greater than that of the vertical mode by 4, an intra prediction mode having an index value less than that of the vertical mode by 4, an intra prediction mode having an index value greater than that of the horizontal mode by 4, and an intra prediction mode having an index value less than that of the horizontal mode by 4. In some embodiments, the default modes may further include other intra prediction modes. The default modes may be included in the fifth set in any order.

In constructing the fifth set, whether the default modes overlap may be determined. For example, it may be determined whether the default modes are already included in the chroma intra prediction mode candidate group. In addition, if the default modes are not included in the chroma intra prediction mode candidate group, the default modes may be included in the fifth set. The intra prediction modes (default modes) included in the fifth set are included in the chroma intra prediction mode candidate group.

According to an embodiment, if the number of intra prediction modes of the first to fourth sets is less than the maximum number of candidates of the chroma intra prediction mode candidate group, the fifth set may be determined. In addition, in the process of constructing the fifth set, if the intra prediction modes of the maximum number of candidates of the chroma intra prediction mode candidate group are all determined, the process of constructing the fifth set is terminated.

The determination order of the first to fifth sets in the chroma intra prediction mode candidate group may be changed according to the embodiments. For example, the order of the second set and the third set may be changed. Alternatively, the order of the first set and the second set, and the order of the first set and the third set may also be changed. Alternatively, the fifth set including the default modes may be included first in the chroma intra prediction mode candidate group, and the first to fourth sets may be included in the chroma intra prediction mode candidate group in a predetermined order.

In addition, according to an embodiment, the chroma intra prediction mode candidate group may be determined based on some of the first to fifth sets. For example, the chroma intra prediction mode candidate group may be determined using only the first to second sets. Alternatively, the chroma intra prediction mode candidate group may be determined using only the first to third sets. Alternatively, the chroma intra prediction mode candidate group may be determined using only the first, second, and fourth sets. In addition, the fifth set may be further included in the chroma intra prediction mode candidate group according to the embodiments. The order of the sets used in the chroma intra prediction mode candidate group among the first to fifth sets may be changed according to the embodiments.

According to an embodiment, a chroma intra prediction mode set (sixth set), which consists of intra prediction modes applied to chroma blocks encoded or decoded before the current chroma block, may be used to determine the chroma intra prediction mode candidate group. The sixth set may include intra prediction modes of chroma blocks that are adjacent to the current chroma block in encoding or decoding order, even if they are not spatially adjacent to the current chroma block.

The chroma block referenced in the sixth set may be derived from a chroma intra mode history list. The chroma intra mode history list may be generated for each predetermined unit. For example, an independent chroma intra mode history list may be generated for each slice or coding tree block. If the current chroma block is intra-predicted, the intra prediction mode that was added first in the list may be excluded from the chroma intra mode history list. Instead, the intra prediction mode applied to the current chroma block is included in the list. If the intra prediction mode of the current chroma block is already included in the chroma intra mode history list, no intra prediction mode is excluded from the list. Instead, the order of the intra prediction modes in the list is changed so that the intra prediction mode applied to the current chroma block is assigned to a predetermined position in the list. The predetermined position is a position assigned to the intra prediction mode that entered the list most recently in the list.

The order in which the intra prediction modes of the sixth set are included in the chroma intra prediction mode set may be determined differently according to the embodiments. According to an embodiment, after the intra prediction modes of the first to third sets are included in the chroma intra prediction mode set, the intra prediction modes of the sixth set may be included in the chroma intra prediction mode set. Alternatively, after the intra prediction modes of the first to fourth sets are included in the chroma intra prediction mode set, the intra prediction modes of the sixth set may be included in the chroma intra prediction mode set. In including the intra prediction modes of the sixth set in the chroma intra prediction mode set, a redundancy check applied to the intra prediction modes of the first to fifth sets may be performed.

Figure 4:
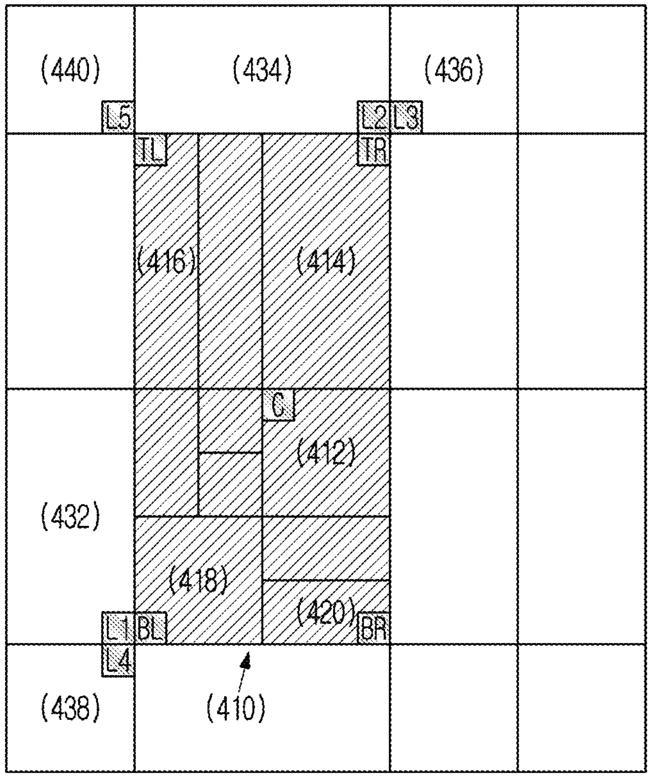
FIG. 4 illustrates luma blocks and chroma blocks for explaining chroma intra prediction modes included in first to third sets.
Figure 4:
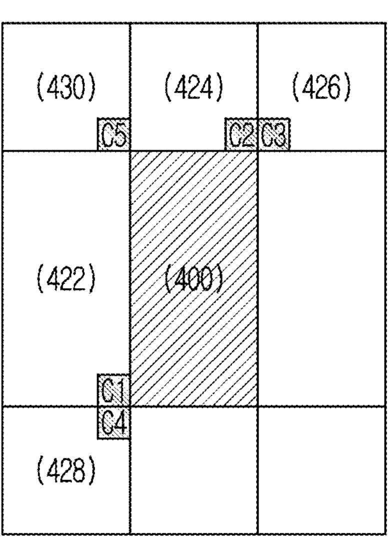

FIG. 4 illustrates luma blocks and chroma blocks for explaining chroma intra prediction modes included in first to third sets.

According to FIG. 4, the positions of a plurality of luma blocks referenced in the multiple direct modes will be explained.

A current chroma block 400 corresponds to a current luma block 410. When a color format is 4:4:4, the size of the current chroma block may be set to be the same as that of the current luma block. In addition, when the color format is 4:2:2, the area of the current chroma block may be set to half of that of the current luma block. In addition, when the color format is 4:2:0, the size of the current chroma block may be set to ¼ of that of the current luma block. FIG. 4 shows the current luma block 410 corresponding to the current chroma block 400 when the color format is 4:2:0.

According to FIG. 4, unlike the current chroma block 400, the current luma block 410 is additionally split. Therefore, the current chroma block 400 may correspond to a plurality of blocks split from the current luma block 410. Some of the plurality of blocks may be referenced in the multiple direct modes.

To determine the first set, the C, TR, TL, BR, and BL positions of the current luma block 410 may be referenced. Five blocks 412, 414, 416, 418 and 420 corresponding to the C, TR, TL, BR, and BL positions of the current luma block 410 may be used in the multiple direct modes. Therefore, the first set may include the intra prediction modes of the blocks 412, 414, 416, 418 and 420. The first set may include the intra prediction modes of the five blocks 412, 414, 416, 418 and 420 in order. However, the order of the intra prediction modes included in the first set may be arbitrarily changed.

At this time, according to redundancy check, the first set may include an intra prediction mode that does not overlap with an intra prediction mode already included in the first set. The intra prediction mode included in the first set may be included in the chroma intra prediction mode candidate group.

To determine the second set, adjacent positions C1, C2, C3, C4, and C5 of the current chroma block 400 may be referenced. The intra prediction modes of the second set may be determined from five blocks 422, 424, 426, 428 and 430 corresponding to C1, C2, C3, C4, and C5 of the current chroma block 400. The second set may include the intra prediction modes of the five blocks 422, 424, 426, 428 and 430 in order. However, the order of the intra prediction modes included in the second set may be arbitrarily changed.

Although the position of C1 is determined to be the lowermost sample among the left samples of the current chroma block 400 in FIG. 4, it may be determined to be the uppermost sample or the central sample among the left samples of the current chroma block 400 according to the embodiments. Also, although the position of C2 is determined to be the rightmost sample among the top samples of the current chroma block 400 in FIG. 4, it may be determined to be the leftmost sample or the central sample among the top samples of the current chroma block 400 according to the embodiments.

Depending on the redundancy check, the second set may include intra prediction modes that do not overlap with the intra prediction modes already included in the first set and the second set. The intra prediction modes included in the second set may be included in the chroma intra prediction mode candidate group.

To determine the third set, adjacent positions L1, L2, L3, L4, and L5 of the current luma block 410 may be referenced. The intra prediction modes of the third set may be determined from five blocks 432, 434, 436, 438 and 440 corresponding to L1, L2, L3, L4, and L5 of the current chroma block 400. The third set may include intra prediction modes of the five blocks 432, 434, 436, 438 and 440 in order. However, the order of the intra prediction modes included in the third set may be arbitrarily changed.

Although the position of L1 is determined to be the lowest sample among the left samples of the current luma block 410 in FIG. 4, it may be determined to be the uppermost sample or the central sample among the left samples of the current luma block 410 according to the embodiments. Also, although the position of L2 is determined to be the rightmost sample among the top samples of the current luma block 410 in FIG. 4, it may be determined to be the leftmost sample or the central sample among the top samples of the current luma block 410 according to the embodiments.

Depending on the redundancy check, the third set may include intra prediction modes that do not overlap with the intra prediction modes already included in the first to third sets. The intra prediction modes included in the third set may be included in the chroma intra prediction mode candidate group.

Figure 5:
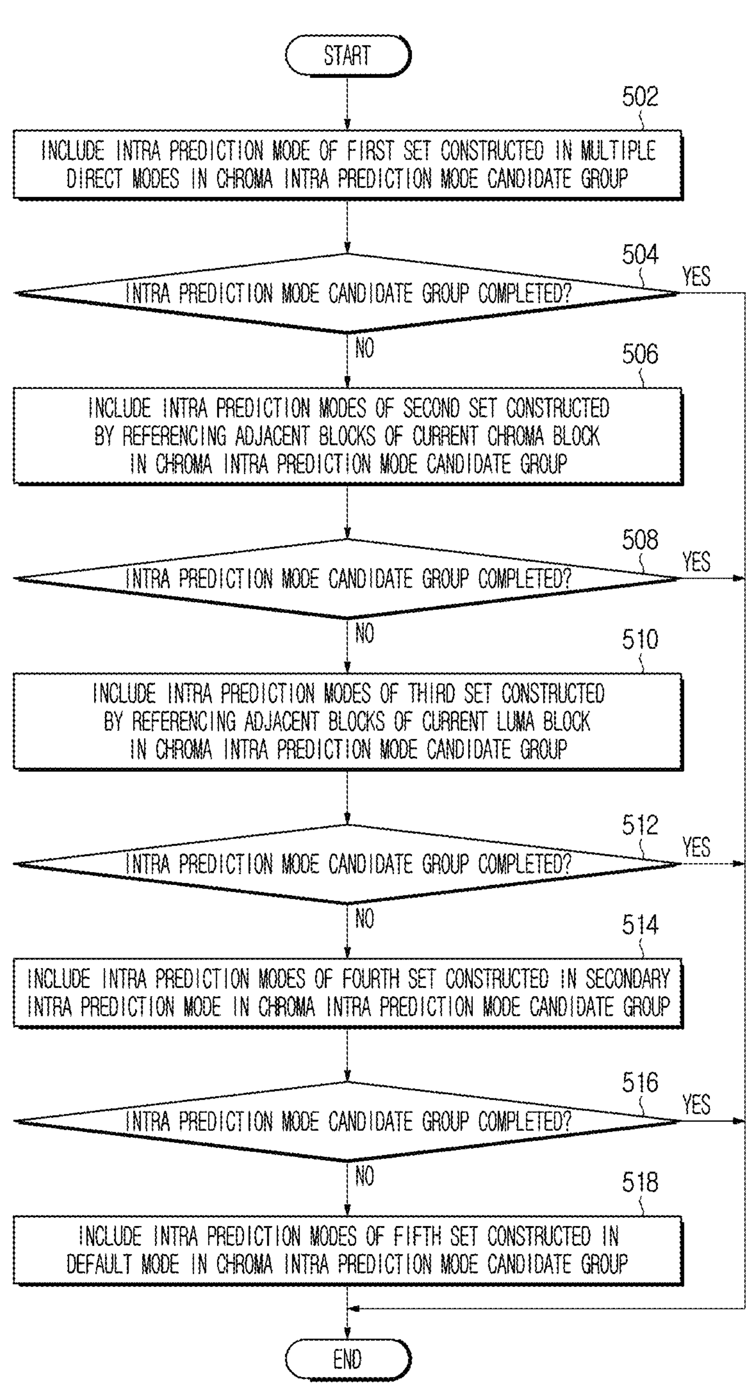
FIG. 5 illustrates a flowchart of a method of determining a chroma intra prediction mode candidate group according to the first to fifth sets described above.

FIG. 5 illustrates a flowchart of a method of determining a chroma intra prediction mode candidate group according to the first to fifth sets described above.

In step 502, the intra prediction modes of the first set constructed in multiple direct modes are included in the chroma intra prediction mode candidate group. Then, in step 504, it is determined whether the chroma a intra prediction mode candidate group is completed in step 502. If an additional intra prediction mode candidate is needed for the chroma intra prediction mode candidate group, step 506 is performed. Then, if the chroma intra prediction mode candidate group is completed, the method is terminated.

In step 506, the intra prediction modes of the second set constructed by referencing adjacent blocks of the current chroma block are included in the chroma intra prediction mode candidate group. Then, in step 508, it is determined whether the chroma intra prediction mode candidate group is completed in step 506. If an additional intra prediction mode candidate is needed for the chroma intra prediction mode candidate group, step 510 is performed. Then, if the chroma intra prediction mode candidate group is completed, the method is terminated.

In step 510, the intra prediction modes of the third set constructed by referencing adjacent blocks of the current luma block are included in the chroma intra prediction mode candidate group. Then, in step 512, it is determined whether the chroma intra prediction mode candidate group is completed in step 510. If an additional intra prediction mode candidate is needed for the chroma intra prediction mode candidate group, step 514 is performed. Then, if the chroma intra prediction mode candidate group is completed, the method is terminated.

In step 514, the intra prediction modes of the fourth set constructed in the secondary intra prediction mode are included in the chroma intra prediction mode candidate group. Then, in step 516, it is determined whether the chroma intra prediction mode candidate group is completed in step 514. If an additional intra prediction mode candidate is needed for the chroma intra prediction mode candidate group, step 518 is performed. Then, if the chroma intra prediction mode candidate group is completed, the method is terminated.

In step 518, the intra prediction modes of the fifth set constructed in the default mode are included in the chroma intra prediction mode candidate group.

In some embodiments, in step 502, the intra prediction modes of a set other than the first set may be included in the chroma intra prediction mode candidate group. In addition, the intra prediction modes included in the chroma intra prediction mode candidate group in steps 506, 510, 514 and 518 may also be sets other than the sets indicated in FIG. 5.

In some embodiments, five sets may not be sequentially included in the chroma intra prediction mode candidate group, and three to four sets may be sequentially included in the chroma intra prediction mode candidate group.

A step of including the intra prediction modes of the sixth set in the chroma intra prediction mode candidate group may be added to the method of FIG. 5.

The chroma intra prediction mode candidate group consisting of the intra prediction modes of the five chroma intra prediction mode sets described above may be used to determine the intra prediction modes of the current chroma block. The intra prediction modes of the current chroma block may be determined from the chroma intra prediction mode candidate group.

In an encoder, chroma intra prediction mode information indicating the intra prediction modes of the current chroma block may be encoded from the chroma intra prediction mode candidate group. In addition, in a decoder, the encoded chroma intra prediction mode information may be decoded.

The chroma intra prediction mode information may be transmitted/parsed using a truncated unary code. Table 1 shows the truncated unary code for each index of the chroma intra prediction mode candidate group having nine chroma intra prediction modes. The chroma intra prediction mode information may have the values described in Table 1 according to the intra prediction modes of the current chroma block.

TABLE 1

| chroma intra prediction mode list index | Truncated unary codeword |
|---|---|
| 1 | 0 or 1 |
| 2 | 10 or 01 |
| 3 | 110 or 001 |
| 4 | 1110 or 0001 |
| 5 | 11110 or 00001 |
| 6 | 111110 or 000001 |
| 7 | 1111110 or 0000001 |
| 8 | 11111110 or 00000001 |
| 9 | 11111111 or 00000000 |

According to an embodiment, the chroma intra prediction modes within the chroma intra prediction mode candidate group may be reordered by considering the priority of the chroma intra prediction modes within the chroma intra prediction mode candidate group. Table 2 below shows examples of chroma intra prediction mode candidates corresponding to the indices of the chroma intra prediction mode candidate group.

TABLE 2

| chroma intra prediction mode candidate group index | chroma intra prediction mode candidate |
|---|---|
| 1 | Mode1 |
| 2 | Mode2 |
| 3 | Mode3 |
| 4 | Mode4 |
| 5 | Mode5 |
| 6 | Mode6 |
| 7 | Mode7 |
| 8 | Mode8 |
| 9 | Mode9 |

In Table 2, Mode1 to Mode9 represent non-overlapping arbitrary intra prediction modes. The chroma intra prediction mode information representing the chroma intra prediction mode selected from the chroma intra prediction mode candidate group is binarized and encoded according to the truncated unary code of Table 1.

As shown in Table 1, according to binarization according to the truncated unary code, fewer bits are allocated to an index with a small value, and more bits are allocated to an index with a large value. Therefore, by allocating an intra prediction mode with a high selection probability to a higher index (index with a small value) of the chroma intra prediction mode candidate group, and allocating a mode with a relatively low selection probability to a lower index (index with a large value) of the chroma intra prediction mode candidate group, the amount of bits of chroma intra prediction mode information may be reduced. Therefore, by reordering the intra prediction mode candidates of the chroma intra prediction mode candidate group proposed above according to the selection probability, the encoding efficiency of the chroma intra prediction mode information may be increased.

Hereinafter, a method of calculating a selection probability of intra prediction mode candidates of a chroma intra prediction mode candidate group will be presented. First, a method of calculating the selection probability of intra prediction modes of a chroma intra prediction mode candidate group using template matching and, accordingly, reordering the intra prediction modes of the chroma intra prediction mode candidate group will be described. Second, a method of calculating the selection probability of intra prediction modes of a chroma intra prediction mode candidate group by considering the occurrence frequency of the chroma intra prediction mode and, accordingly, reordering the intra prediction modes of the chroma intra prediction mode candidate group will be described.

As mentioned above, the intra prediction mode candidates in the chroma intra prediction mode candidate group may be reordered using template matching.

According to a template matching-based reordering method according to an embodiment, it is determined whether each intra prediction mode candidate included in a chroma intra prediction mode candidate group of a current chroma block is suitable for a template of the current chroma block. Here, the template represents a predetermined peripheral range of the current chroma block. For example, the template may include a left adjacent sample range and a top adjacent sample range of the current chroma block. An intra prediction mode having high prediction accuracy for a template adjacent to the current chroma block is likely to have high prediction accuracy for the current chroma block as well. Therefore, in reordering the chroma intra prediction mode candidate group of the current chroma block, by assigning a high priority to an intra prediction mode having a high suitability for the template of the current chroma block, the encoding efficiency of chroma intra prediction mode information can be increased.

According to an embodiment, a prediction template for a template is generated according to the directionality of an intra prediction mode candidate. In addition, in order to predict the template according to the directionality of the intra prediction mode candidate, reference samples adjacent to the template may be used. For example, top reference samples and left reference samples of the template may be used for prediction of the template. In addition, based on a difference between a pixel of the prediction template and a pixel of an already reconstructed template, an evaluation value of the intra prediction mode candidate is calculated. The evaluation value represents the prediction accuracy of the intra prediction mode candidate for the template of the current chroma block, and it may be considered that the smaller the evaluation value, the higher the prediction accuracy of the intra prediction mode candidate for the template of the current chroma block. The evaluation value may be calculated by any of the following methods: a sum of absolute differences (SAD), a sum of square errors (SSE), or a sum of absolute transformed differences (SATD) based on the pixel of the prediction template and the pixel of the reconstructed template.

According to the evaluation value of each intra prediction mode candidate, the order of the intra prediction mode candidates of the chroma intra prediction mode candidate group for the current chroma block may be reordered. For example, an intra prediction mode candidate having a small evaluation value may be assigned to a higher index (an index with a small value), and an intra prediction mode candidate having a large evaluation value may be assigned to a lower index (an index with a large value). In this way, the template-based difference value for each chroma candidate mode in the chroma intra prediction mode list may be compared to readjust its position in the chroma intra prediction mode list.

FIG. 6 shows a template of a current chroma block used in a template-based intra mode derivation method and reference pixels of the template used to generate a prediction template.

A current chroma block 600 is a block with a size of M×N. In addition, a template 610 of the current chroma block 600 includes a left template 612 with a size of L1×N and adjacent to the current chroma block 600 and a top template 614 with a size of M×L2. Here, L1 and L2 are integer values greater than or equal to 1. L1 and L2 may be determined to be the same value. Alternatively, L1 and L2 may be determined to be proportional to M and N, respectively. In some embodiments, the template 610 may further include a top left template 616 with a size of L1×L2 and adjacent to the current chroma block 600.

The template 610 of the current chroma block 600 may be predicted by referencing adjacent reference samples 620 around the template 610. The adjacent reference samples 620 may include 2 (N+L2)+1 reference samples from the immediately adjacent left reference sample line 622 in the left template 612. In addition, the adjacent reference samples

620 may include 2 (M+L1) reference samples from the immediately adjacent top reference sample line 626 in the top template 614.

According to an embodiment, the template 610 may be predicted by referencing a reference sample 630 below the left template 612 instead of the N+L2 reference samples 624 below the left reference sample line 622. Additionally, the template 610 may be predicted by referencing the reference sample 632 on the right side of the top template 614 instead of the M+L1 reference samples 628 on the right side of the top reference sample line 626.

As mentioned above, the intra prediction mode candidates in the chroma intra prediction mode candidate group may be reordered according to the occurrence frequency of the intra prediction mode.

The occurrence frequency of each intra prediction mode candidate of the chroma intra prediction mode candidate group is determined. For example, the occurrence frequency of the intra prediction mode candidate may be calculated from the intra prediction modes of the reference blocks of the first to third sets. For example, according to FIG. 4, since each of the first to third sets references 5 reference blocks, a maximum of 15 reference blocks may be referenced in determining the occurrence frequency of the intra prediction mode candidate. Therefore, the occurrence frequency of the intra prediction mode candidate may be determined according to the intra prediction modes of the maximum of 15 reference blocks.

If two or more of the reference positions for determining the reference block indicate one reference block, the occurrence frequency of the intra prediction mode candidate may be determined according to the number of reference positions included in the one reference block. Alternatively, conversely, the occurrence frequency of the intra prediction mode candidate may be determined regardless of the number of reference positions included in the one reference block.

Depending on the occurrence frequency of each intra prediction mode candidate, the chroma intra prediction mode candidate group may be reordered. For example, an intra prediction mode candidate with a high occurrence frequency may be assigned to a higher index (an index with a small value), and an intra prediction mode candidate with a low occurrence frequency may be assigned to a lower index (an index with a large value).

According to an embodiment, by the redundancy check of the first to third sets described above, the intra prediction mode already included in the chroma intra prediction mode candidate group is no longer included in the chroma intra prediction mode candidate group. Instead, if the intra prediction mode derived for the first to third sets is not included in the chroma intra prediction mode candidate group according to the redundancy check, the redundancy count for the intra prediction mode may be increased by 1. The redundancy count represents the occurrence frequency of the intra prediction mode candidate included in the chroma intra prediction mode candidate group.

In addition, according to the magnitude of the redundancy count of each intra prediction mode candidate, the chroma intra prediction mode candidate group may be reordered. For example, an intra prediction mode candidate with a large redundancy count may be assigned to a higher index (an index with a small value), and an intra prediction mode candidate with a small redundancy count may be assigned to a lower index (an index with a large value). By determining the occurrence frequency of the intra prediction mode candidate using the redundancy count determined in the intra prediction mode candidate derivation process, a step of separately calculating the occurrence frequency of the intra prediction mode candidate after determining the intra prediction mode candidate may be omitted.

According to an embodiment, the occurrence frequency of the intra prediction mode candidate may be determined from all relevant blocks related to the current chroma block. According to FIG. 4, only blocks at specific positions are used to determine the intra prediction modes of the first to third sets. However, according to an embodiment, in order to determine the occurrence frequency of the already determined intra prediction mode candidate, intra prediction modes of all relevant blocks related to the current chroma block may be considered. For example, by referencing intra prediction modes of all blocks included in the current luma block, intra prediction modes of all adjacent chroma blocks of the current chroma block, and intra prediction modes of all adjacent luma blocks of the current luma block, the occurrence frequency of each intra prediction mode candidate may be determined. In addition, according to the occurrence frequency of each intra prediction mode candidate, the chroma intra prediction mode candidate group may be reordered.

According to an embodiment, blocks that are not immediately adjacent to the current chroma block but were encoded (or decoded) prior to encoding (or decoding) of the current chroma block may also be considered as relevant blocks of the current chroma block. For example, all chroma blocks included in a coding tree block or slice included in the current chroma block may be considered as relevant blocks of the current chroma block. Alternatively, among the chroma blocks included in a coding tree block or slice included in the current chroma block, chroma blocks that were recently encoded (or decoded) from the current chroma block may be considered as relevant blocks of the current chroma block. Whether the chroma blocks were recently encoded (or decoded) may be determined based on whether the difference in coding order between the current chroma block and the encoded (or decoded) block is less than a predetermined value.

According to an embodiment, in determining the occurrence frequency of the intra prediction mode candidate, the area of the reference block may be considered instead of the number of reference blocks. The total areas of one or more reference blocks in which the intra prediction mode candidate is used may be summed, and an occurrence frequency score may be determined according to the total area. Then, according to the occurrence frequency score of each intra prediction mode candidate, the chroma intra prediction mode candidate group may be reordered. Then, according to the occurrence frequency score, the chroma intra prediction mode candidate group may be reordered. Alternatively, in some embodiments, both the number and the area of the reference blocks of the intra prediction mode candidate may be considered in calculating the occurrence frequency score.

FIG. 7 illustrates blocks for determining the occurrence frequency of an intra prediction mode for reordering an intra prediction mode candidate of a chroma intra prediction mode candidate group.

FIG. 7 illustrates a current chroma block 700 and a current luma block 710 corresponding thereto. In addition, the current luma block 710 includes eight blocks 712 to 726. Four left adjacent blocks 730, 732, 734 and 736, four top adjacent blocks 742, 744, 746 and 748, and one top left adjacent block 740 are adjacent to the current chroma block 700. In addition, eight left adjacent blocks 750 to 764, eight top adjacent blocks 772 to 786, and one top left adjacent block 770 are adjacent to the current luma block 710.

When the occurrence frequency of the intra prediction mode candidate is determined by referencing only the reference blocks of the first to third sets, the occurrence frequency of the intra prediction mode candidate is determined from four blocks 712, 716, 722 and 726 of the current luma block 710, five blocks 732, 734, 740, 744 and 746 adjacent to the current chroma block 700, and five blocks 756, 758, 770, 778 and 780 adjacent to the current luma block 710. According to an embodiment, since the block 726 includes both the reference positions C and BR, the intra prediction mode of the block 726 may be counted twice in calculating the occurrence frequency of the intra prediction mode candidate.

When the occurrence frequency of the intra prediction mode candidate is determined from all blocks related to the current chroma block 700, the occurrence frequency of the intra prediction mode candidate is determined from eight blocks 712 to 726 of the current luma block 710, nine blocks 730 to 736 and 740 to 748 adjacent to the current chroma block 700, and 17 blocks 750 to 764 and 770 to 786 adjacent to the current luma block 710.

However, blocks that are not immediately adjacent to the current chroma block 700 or the current luma block 710 may be excluded from calculation of the occurrence frequency. For example, chroma blocks 736 and 748 that are not immediately adjacent to the current chroma block 700 and luma blocks 760, 762, 764, 782, 784 and 786 that are not immediately adjacent to the current luma block 710 may be excluded from calculation of the occurrence frequency.

In determining the occurrence frequency of the intra prediction mode, the area of the reference block may be considered. For example, since the area of the block 712 is four times that of the block 714, the weight of the block 712 may be determined to be four times that of the block 714 in calculating the occurrence frequency.

As discussed above, in some embodiments, the occurrence frequency of the intra prediction mode candidate of the chroma intra prediction mode candidate group may be determined by referencing some of the luma blocks and chroma blocks of FIG. 7.

In the present invention, a method of efficiently encoding or decoding intra prediction mode candidates of a chroma intra prediction mode candidate group is proposed.

Table 1 shows codewords for binarizing index information for nine intra prediction mode candidates of a chroma intra prediction mode candidate group using a truncated unary code. As shown in Table 1, fewer bits are allocated to an index with a small value, while more bits are allocated to an index with a large value. Therefore, by allocating an index with a small value to an intra prediction mode candidate with a high selection probability, the encoding efficiency of the chroma intra prediction mode may be increased.

However, if the selection probabilities of the intra prediction mode candidates of the chroma intra prediction mode candidate group are almost similar, it may be efficient to binarize the index information into a fixed length code (FLC) instead of binarizing it into a truncated unary code. In the case of binarizing the index information into a fixed length code, it may be efficient to determine the number of intra prediction mode candidates of the chroma intra prediction mode candidate group to be an exponent of 2. For example, the number of intra prediction mode candidates of the chroma intra prediction mode candidate group may be 2, 4, 8, 16, etc.

If the chroma intra prediction mode candidate group includes nine intra prediction mode candidates, dominant flag information may be used to efficiently transmit/parse index information. Table 3 shows a codeword for transmitting/parsing each index of the chroma intra prediction mode list having nine chroma intra prediction modes using dominant flag information.

TABLE 3

| chroma intra prediction mode candidate group index | codeword |
|---|---|
| 1 | 0 or 1 |
| 2 | 1000 or 0000 |
| 3 | 1001 or 0001 |
| 4 | 1010 or 0010 |
| 5 | 1011 or 0011 |
| 6 | 1100 or 0100 |
| 7 | 1101 or 0101 |
| 8 | 1110 or 0110 |
| 9 | 1111 or 0111 |

As shown in Table 3, a codeword of 0 or 1 is assigned to a first intra prediction mode (index 1) of the chroma intra prediction mode candidate group. Therefore, only the dominant flag information is used to encode the first intra prediction chroma intra mode (index 1). Thereafter, for a second prediction mode (index 2) to a ninth chroma intra prediction mode (index 9) of the chroma intra prediction mode candidate group, the discriminated bit of the dominant flag information for distinguishing it from the first chroma intra prediction mode and the remainder index information for distinguishing the eight intra prediction modes are used. When the chroma intra prediction mode candidate group includes nine intra prediction modes, the remaining index information may have a fixed length of 3 bits. When there is one special chroma intra prediction mode with high usage frequency, the index information may be efficiently encoded/decoded by using the dominant flag as shown in Table 3.

Figure 8:
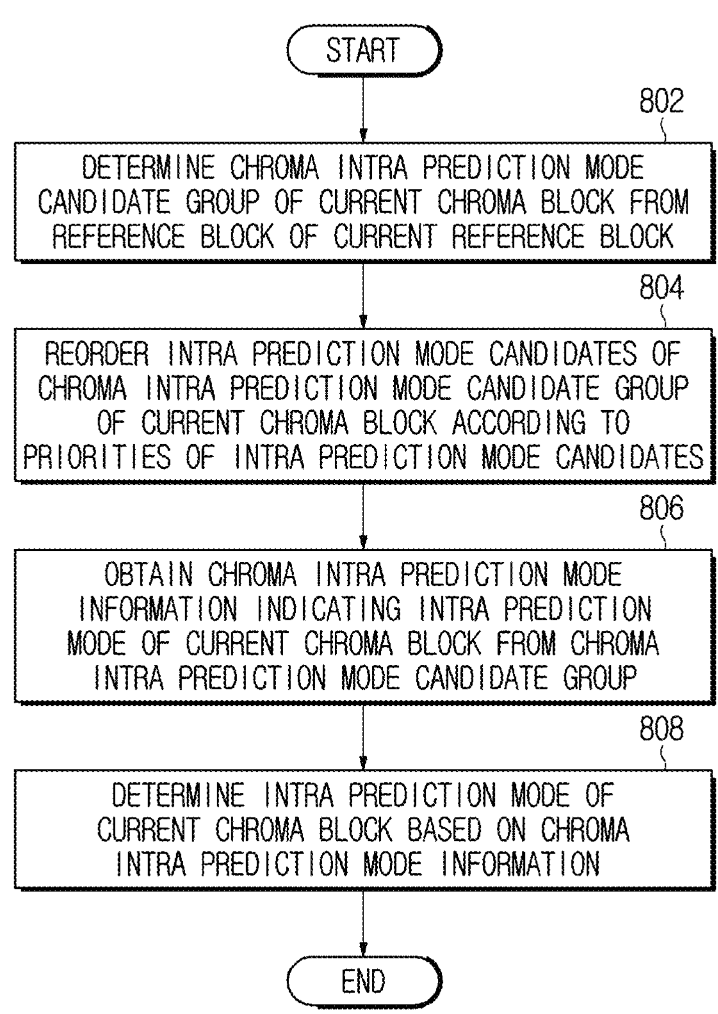
FIG. 8 shows an embodiment of an image decoding method according to the present invention.

FIG. 8 shows an embodiment of an image decoding method according to the present invention.

In step 802, a chroma intra prediction mode candidate group of a current chroma block is determined from a reference block of the current chroma block.

According to an embodiment, the reference block of the current chroma block may include a plurality of luma blocks split from a current luma block corresponding to the current chroma block. The plurality of luma blocks correspond to a plurality of reference positions of the current chroma block, and the plurality of reference positions may include at least two of a center position, a top left position, a top right position, a bottom left position, and a bottom right position.

According to an embodiment, the reference block of the current chroma block may include a chroma block adjacent to the current chroma block. The block adjacent to the current chroma block may include at least one of a left chroma block, a top chroma block, a bottom left chroma block, a top right chroma block, or a top left chroma block of the current chroma block.

According to an embodiment, the reference block of the current chroma block may include a luma block adjacent to a current luma block corresponding to the current chroma block. The block adjacent to the current luma block may include at least one of a left luma block, a top luma block, a bottom left luma block, a top right luma block, or a top left luma block of the current luma block.

According to an embodiment, in step 802, a step of including an intra prediction mode of a reference block of the current chroma block in the chroma intra prediction mode candidate group, and a step of including a secondary intra prediction mode derived from an intra prediction mode candidate included in the chroma intra prediction mode candidate group in the chroma intra prediction mode candidate group when the number of intra prediction mode candidates included in the chroma intra prediction mode candidate group is smaller than a predetermined value may be included. The secondary intra prediction mode may be an intra prediction mode having an index value that is greater or less by a predetermined value than an index value of an intra prediction mode candidate of the chroma intra prediction mode candidate group.

According to an embodiment, in step 802, a step of including an intra prediction mode derived from a reference block of the current chroma block in the chroma intra prediction mode candidate group and a step of including a default mode in the chroma intra prediction mode candidate group when the number of intra prediction mode candidates included in the chroma intra prediction mode candidate group is less than a predetermined value may be included.

According to an embodiment, in step 802, a step of extracting an intra prediction mode from a reference block of the current chroma block and a step of including the extracted intra prediction mode in the chroma intra prediction mode candidate group when the extracted intra prediction mode does not overlap with an intra prediction mode candidate included in the chroma intra prediction mode candidate group may be included.

In step 804, when the intra prediction mode candidates of the chroma intra prediction mode candidate group are determined, the intra prediction mode candidates of the chroma intra prediction mode candidate group of the current chroma block may be reordered according to the priorities of the intra prediction mode candidates.

According to an embodiment, the priorities of the intra prediction mode candidates may be determined based on a template of the current chroma block. The template is a reconstructed region with a predetermined size and adjacent to at least one of a left or upper direction from the current chroma block, and the priorities of the intra prediction mode candidates may be determined based on a difference between a reconstructed sample of the template and a prediction sample of the template predicted according to the intra prediction mode candidate.

According to an embodiment, the priorities of the intra prediction mode candidates may be determined based on a plurality of relevant blocks of the current chroma block. The priorities of the intra prediction mode candidates may be determined by calculating the number of relevant blocks to which the intra prediction mode candidate is applied among the plurality of relevant blocks or a total area of the relevant blocks. The relevant blocks of the current chroma block may include at least one of a luma block included in a current luma block corresponding to the current chroma block, a chroma block adjacent to the current chroma block, a luma block adjacent to the current luma block, or a chroma block decoded before decoding of the current chroma block.

In step 806, chroma intra prediction mode information indicating the intra prediction mode of the current chroma block is obtained from the chroma intra prediction mode candidate group.

According to an embodiment, the chroma intra prediction mode information may be characterized by including: dominant flag information indicating whether a first intra prediction mode candidate of the chroma intra prediction mode candidate group is an intra prediction mode of the current chroma block; and remaining index information indicating an intra prediction mode of the current chroma block among the remaining intra prediction mode candidates excluding the first intra prediction mode candidate of the chroma intra prediction mode candidate group when the dominant flag information indicates that the intra prediction mode of the current chroma block is not the first intra prediction mode candidate of the chroma intra prediction mode candidate group.

According to an embodiment, the chroma intra prediction mode information may be binarized according to a truncated unary code as shown in Table 1, or may be binarized according to a fixed-length code.

In step 808, based on the chroma intra prediction mode information, the intra prediction mode of the current chroma block is determined from the chroma intra prediction mode candidate group.

Figure 9:
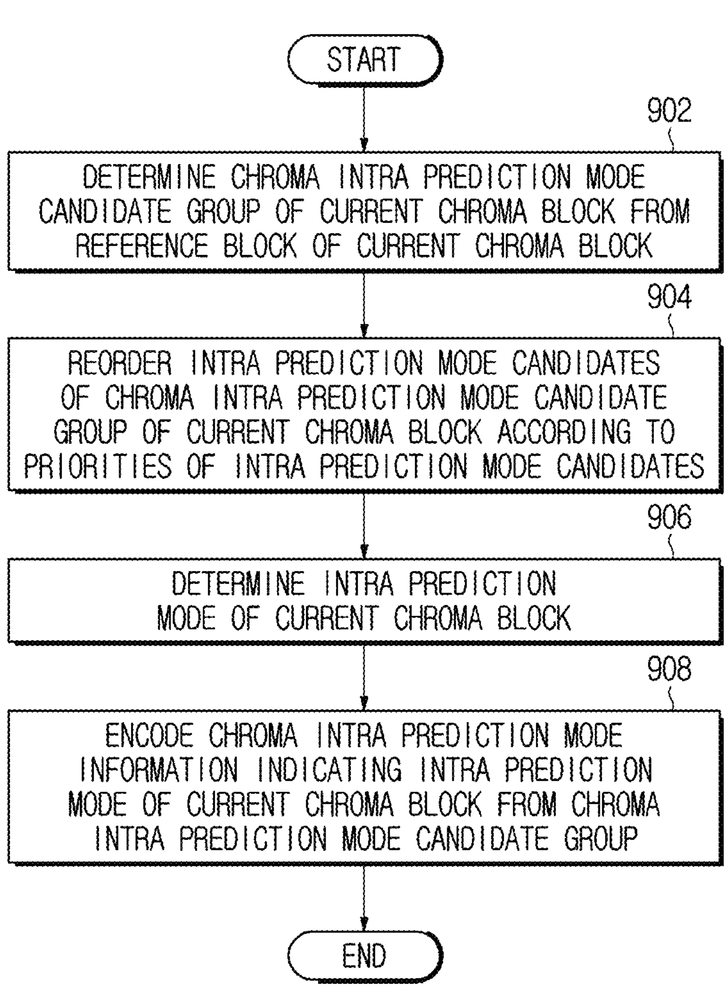
FIG. 9 shows an embodiment of an image encoding method according to the present invention.

FIG. 9 shows an embodiment of an image encoding method according to the present invention.

In step 902, an intra prediction mode candidate group of a current chroma block may be determined from a reference block of the current chroma block.

In step 904, the intra prediction mode candidates of the chroma intra prediction mode candidate group of the current chroma block may be reordered according to the priorities of the intra prediction mode candidates.

For the determination of the intra prediction mode candidate group in steps 902 and 904, the determination method and the reordering method of the intra prediction mode candidate group described for steps 802 and 804 may be applied.

In step 906, the intra prediction mode of the current chroma block may be determined.

In step 908, chroma intra prediction mode information representing the intra prediction mode of the current chroma block may be encoded from the intra prediction mode candidate group. The chroma intra prediction mode information of step 908 may also be binarized like the chroma intra prediction mode information of step 808.

Figure 10:
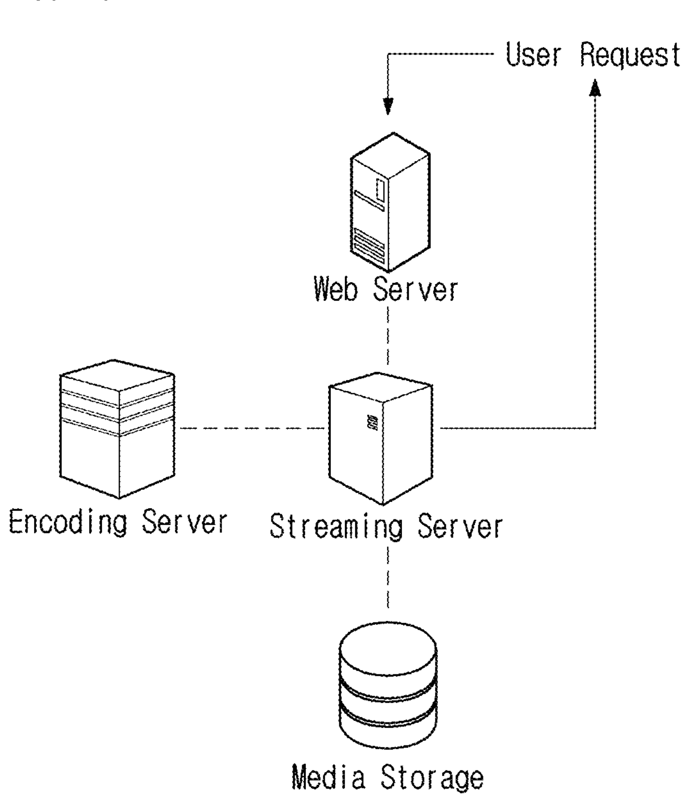
FIG. 10 exemplarily illustrates a content streaming system to which an embodiment according to the present invention is applicable.

FIG. 10 exemplarily illustrates a content streaming system to which an embodiment according to the present invention is applicable.

As illustrated in FIG. 10, a content streaming system to which an embodiment of the present invention is applied may largely include an encoding server, a streaming server, a web server, a media storage, a user device, and a multimedia input device.

The encoding server compresses content received from multimedia input devices such as smartphones, cameras, CCTVs, etc. into digital data to generate a bitstream and transmits it to the streaming server. As another example, if multimedia input devices such as smartphones, cameras, CCTVs, etc. directly generate a bitstream, the encoding server may be omitted.

The bitstream may be generated by an image encoding method and/or an image encoding apparatus to which an embodiment of the present invention is applied, and the streaming server may temporarily store the bitstream in the process of transmitting or receiving the bitstream.

The streaming server transmits multimedia data to a user device based on a user request via a web server, and the web server may act as an intermediary that informs the user of any available services. When a user requests a desired service from the web server, the web server transmits it to the streaming server, and the streaming server may transmit multimedia data to the user. At this time, the content streaming system may include a separate control server, and in this case, the control server may control commands/responses between devices within the content streaming system.

The streaming server may receive content from a media storage and/or an encoding server. For example, when receiving content from the encoding server, the content may be received in real time. In this case, in order to provide a smooth streaming service, the streaming server may store the bitstream for a certain period of time.

Examples of the user devices may include mobile phones, smartphones, laptop computers, digital broadcasting terminals, personal digital assistants (PDAs), portable multimedia players (PMPs), navigation devices, slate PCs, tablet PCS, ultrabooks, wearable devices (e.g., smartwatches, smart glasses, HMDs), digital TVs, desktop computers, digital signage, etc.

Each server in the above content streaming system may be operated as a distributed server, in which case data received from each server may be distributed and processed.

The above embodiments may be performed in the same or corresponding manner in the encoding apparatus and the decoding apparatus. In addition, an image may be encoded/decoded using at least one or a combination of at least one of the above embodiments.

The order in which the above embodiments are applied may be different in the encoding apparatus and the decoding apparatus. Alternatively, the order in which the above embodiments are applied may be the same in the encoding apparatus and the decoding apparatus.

The above embodiments may be performed for each of the luma and chroma signals. Alternatively, the above embodiments for the luma and chroma signals may be performed identically.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field.

A bitstream generated by the encoding method according to the above embodiment may be stored in a non-transitory computer-readable recording medium. In addition, a bitstream stored in the non-transitory computer-readable recording medium may be decoded by the decoding method according to the above embodiment.

Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used in an apparatus for encoding/decoding an image and a recording medium for storing a bitstream.

The invention claimed is:

1. An image decoding method comprising:

determining a chroma intra prediction mode candidate group of a current chroma block from a reference block of the current chroma block;

determining each of priorities of the intra prediction mode candidates based on an evaluation value derived from a template region, wherein the template region is a reconstructed region with a predetermined size and adjacent to at least one of a left or upper direction from the current chroma block;

reordering intra prediction mode candidates of the chroma intra prediction mode candidate group of the current chroma block according to the priorities of the intra prediction mode candidates;

obtaining chroma intra prediction mode information indicating an intra prediction mode of the current chroma block from the chroma intra prediction mode candidate group; and determining the intra prediction mode of the current chroma block based on the chroma intra prediction mode information, wherein an evaluation value of an intra prediction mode candidate is calculated based on differences between prediction sample values and reconstructed sample values for corresponding samples in a template region, wherein each prediction sample value is derived based on a prediction direction of the intra prediction mode candidate and one or more reference sample lines of the template region; and wherein the one or more reference sample lines of the template region include at least one of (i) one or more top reference sample lines adjacent to the template region in an upper direction or (ii) one or more left reference sample lines adjacent to the template region in a left direction.

2. The image decoding method of claim 1, wherein the reference block of the current chroma block comprises a plurality of luma blocks split from a current luma block corresponding to the current chroma block.

3. The image decoding method of claim 2, wherein the plurality of luma blocks corresponds to a plurality of reference positions of the current chroma block, and wherein the plurality of reference positions comprises at least two of a center position, a top left position, a top right position, a bottom left position, and a bottom right position.

4. The image decoding method of claim 1, wherein the reference block of the current chroma block comprises a chroma block adjacent to the current chroma block.

5. The image decoding method of claim 4, wherein the block adjacent to the current chroma block comprises at least one of a left chroma block, a top chroma block, a bottom left chroma block, a top right chroma block or a top left chroma block of the current chroma block.

6. The image decoding method of claim 1, wherein the reference block of the current chroma block comprises a luma block adjacent to a current luma block corresponding to the current chroma block.

7. The image decoding method of claim 6, wherein the block adjacent to the current luma block comprises at least one of a left luma block, a top luma block, a bottom left luma block, a top right luma block or a bottom left luma block of the current luma block.

8. The image decoding method of claim 1, wherein the determining the chroma intra prediction mode candidate group of the current chroma block from the reference block of the current chroma block comprises:

including an intra prediction mode of the reference block of the current chroma block in the chroma intra prediction mode candidate group; and including a secondary intra prediction mode derived from an intra prediction mode candidate included in the chroma intra prediction mode candidate group in the chroma intra prediction mode candidate group, when the number of intra prediction mode candidates included in the chroma intra prediction mode candidate group is less than a predetermined value.

9. The image decoding method of claim 8, wherein the secondary intra prediction mode is an intra prediction mode with an index value greater or less by a predetermined value than an index value of an intra prediction mode candidate of the chroma intra prediction mode candidate group.

10. The image decoding method of claim 1, wherein the determining the chroma intra prediction mode candidate group of the current chroma block from the reference block of the current chroma block comprises:

including an intra prediction mode derived from the reference block of the current chroma block in the chroma intra prediction mode candidate group; and including a default mode in the chroma intra prediction mode candidate group, when the number of intra prediction mode candidates included in the chroma intra prediction mode candidate group is less than a predetermined value.

11. The image decoding method of claim 1, wherein the determining the chroma intra prediction mode candidate group of the current chroma block from the reference block of the current chroma block comprises:

extracting an intra prediction mode from the reference block of the current chroma block; and including the extracted intra prediction mode in the chroma intra prediction mode candidate group, when the extracted intra prediction mode does not overlap with an intra prediction mode candidate included in the chroma intra prediction mode candidate group.

12. The image decoding method of claim 1, wherein the priorities of the intra prediction mode candidates are determined based on a plurality of relevant blocks of the current chroma block.

13. The image decoding method of claim 12, wherein the priorities of the intra prediction mode candidates are determined by calculating the number of relevant blocks to which the intra prediction mode candidates are applied or a total area of the relevant blocks.

14. The image decoding method of claim 12, wherein the relevant blocks of the current chroma block comprise at least one of a luma block included in a current luma block corresponding to the current chroma block, a chroma block adjacent to the current chroma block, a luma block adjacent to the current luma block or a chroma block decoded before decoding the current chroma block.

15. The image decoding method of claim 1, wherein the chroma intra prediction mode information comprises:

dominant flag information indicating whether a first intra prediction mode candidate of the chroma intra prediction mode candidate group is an intra prediction mode of the current chroma block; and remaining index information indicating an intra prediction mode of the current chroma block among remaining intra prediction mode candidates excluding the first intra prediction mode candidate of the chroma intra prediction mode candidate group, when the dominant flag information indicates that an intra prediction mode of the current chroma block is not the first intra prediction mode candidate of the chroma intra prediction mode candidate group.

16. An image encoding method comprising:

determining a chroma intra prediction mode candidate group of a current chroma block from a reference block of the current chroma block;

determining each of priorities of the intra prediction mode candidates based on an evaluation value derived from a template region, wherein the template region is a reconstructed region with a predetermined size and adjacent to at least one of a left or upper direction from the current chroma block;

reordering intra prediction mode candidates of the chroma intra prediction mode candidate group of the current chroma block according to the priorities of the intra prediction mode candidates;

determining the intra prediction mode of the current chroma block; and encoding chroma intra prediction mode information indicating the intra prediction mode of the current chroma block from the chroma intra prediction mode candidate group, wherein an evaluation value of an intra prediction mode candidate is calculated based on differences between prediction sample values and reconstructed sample values for corresponding samples in a template region, wherein each prediction sample value is derived based on a prediction direction of the intra prediction mode candidate and one or more reference sample lines of the template region; and wherein the one or more reference sample lines of the template region include at least one of (i) one or more top reference sample lines adjacent to the template region in an upper direction or (ii) one or more left reference sample lines adjacent to the template region in a left direction.

17. A method of transmitting a bitstream generated by an image encoding method, the method comprising:

encoding an image based on the image encoding method; and transmitting a bitstream including the encoded image, wherein the image encoding method comprises:

determining a chroma intra prediction mode candidate group of a current chroma block from a reference block of the current chroma block;

determining each of priorities of the intra prediction mode candidates based on an evaluation value derived from a template region, wherein the template region is a reconstructed region with a predetermined size and adjacent to at least one of a left or upper direction from the current chroma block;

reordering intra prediction mode candidates of the chroma intra prediction mode candidate group of the current chroma block according to the priorities of the intra prediction mode candidates;

determining the intra prediction mode of the current chroma block; and encoding chroma intra prediction mode information indicating the intra prediction mode of the current chroma block from the chroma intra prediction mode candidate group, wherein an evaluation value of an intra prediction mode candidate is calculated based on differences between prediction sample values and reconstructed sample values for corresponding samples in a template region, wherein each prediction sample value is derived based on a prediction direction of the intra prediction mode candidate and one or more reference sample lines of the template region; and wherein the one or more reference sample lines of the template region include at least one of (i) one or more top reference sample lines adjacent to the template region in an upper direction or (ii) one or more left reference sample lines adjacent to the template region in a left direction.

* * * * *